United States Patent [19]

Mori et al.

[11] Patent Number: 4,948,784

[45] Date of Patent: Aug. 14, 1990

[54] PLATINUM CONTAINING PULLULAN DERIVATIVES AND COMPOSITIONS CONTAINING THE SAME

[75] Inventors: Fumio Mori; Masafumi Okada; Shuji Miki, all of Okayama; Iwao Ebashi, Kumamoto; Takashi Nishida; Kouichiro Kawai, both of Okayama; Tazuko Tashiro; Shigeru Tsukagoshi, both of Tokyo, all of Japan

[73] Assignee: Kuraray Company, Ltd., Kurashiki, Japan

[21] Appl. No.: 163,961

[22] PCT Filed: May 20, 1987

[86] PCT No.: PCT/JP87/00322

§ 371 Date: Jan. 20, 1988

§ 102(e) Date: Jan. 20, 1988

[87] PCT Pub. No.: WO87/07142

PCT Pub. Date: Dec. 3, 1987

[30] Foreign Application Priority Data

May 21, 1986 [JP] Japan ................ 61-117969
Mar. 6, 1987 [JP] Japan ................ 62-52273

[51] Int. Cl.$^5$ .................. A61K 31/70; C07M 23/00
[52] U.S. Cl. .................. 514/54; 536/121; 536/187
[58] Field of Search .............. 536/1.1, 121; 514/23, 514/54

[56] References Cited

U.S. PATENT DOCUMENTS

| | | | |
|---|---|---|---|
| 3,972,997 | 8/1976 | Makashio et al. | 514/54 |
| 4,228,090 | 4/1979 | Hydes et al. | 536/121 |
| 4,575,550 | 3/1986 | Totani | 536/121 |
| 4,584,392 | 10/1983 | Smith et al. | 536/121 |

FOREIGN PATENT DOCUMENTS

| | | | |
|---|---|---|---|
| 0099133 | 1/1984 | European Pat. Off. | |
| 0190464 | 8/1986 | European Pat. Off. | |
| 0067595 | 4/1982 | Japan | 536/121 |

OTHER PUBLICATIONS

Chemical Abstracts, vol. 90, 1979, p. 46, abstract No. 48459s, Columbus, Ohio, U.S.; E. Heinen et al.

Chemical Abstracts; vol. 77; No. 13, Sep. 25th, 1972, p. 1, abstract No. 83330w, Columbus, Ohio, U.S.; A. J. Thomson et al.

Primary Examiner—John W. Rollins
Assistant Examiner—Elli Peselev
Attorney, Agent, or Firm—Oblon, Spivak, McClelland, Maier & Neustadt

[57] ABSTRACT

A pullulan derivative having one or more active sites resulting from introduction of sulfuric acid, phosphoric acid, a sulfonic acid or a carboxylic acid, wherein one hydrogen atom of the group of the formula

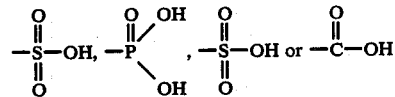

occurring at said active sites is partly substituted by a group of the general formula

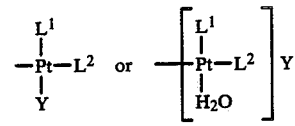

wherein L$^1$ and L$^2$ each independently is ammine or a unidentate ligand amine or combinedly represent a bidentate ligand amine and Y is an anionic ligand, and/or two hydrogen atoms of the group

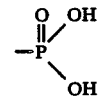

or of two (Abstract continued on next page.)

groups bound to one and the same carbon atom or to two neighboring carbon atoms as occurring at said active sites are, each independently, partly substituted by a group of the general formula

wherein $L^1$ and $L^2$ are as defined above, and a pharmacologically acceptable salt thereof.

The above compound has anticancer activity and is useful as anticancer agents.

The present invention is concerned with said compound, a process for producing the same and a pharmaceutical use thereof.

8 Claims, 42 Drawing Sheets

PLATINUM CONTAINING PULLULAN DERIVATIVES AND COMPOSITIONS CONTAINING THE SAME

TECHNICAL FIELD

This invention relates to novel macromolecular complexes and, more particularly, to water-soluble macromolecular complexes derived from cis-platinum(II) complexes.

This invention also relates to a process for producing the novel macromolecular complexes, and to a pharmaceutical use of said novel macromolecular complexes.

BACKGROUND ART

Since B. Rosenberg et al. discovered in 1969 the fact that cis-dichlorodiammineplatinum(II), a platinum complex called cisplatin by generic name, has anticancer activity against Sarcoma 180, intensive research and development works have hitherto been conducted on cancer chemotherapy using platinum complexes in various countries and now platinum complexes as unique broad-spectrum anticancer agents are attracting much attention. Reportedly, however, cisplatin has very strong nephrotoxicity and, due to its accumulability, causes gastrointestinal disorders, hypofunction of the bonemarrow, hearing impairment and so forth and, furthermore, causes severe nausea and vomiting, among others, at the time of administration, causing unimaginably severe pain in patients. In addition, the solubility of cisplatin in water is as low as about 1 mg/ml and therefore it is difficult to formulate therapeutically effective dosage forms containing it. In spite of these drawbacks, cisplatin is currently in use as an essential means in the treatment of testicular tumor, ovarian cancer, bladder cancer, head and neck tumors, etc., but its use is much restricted as a matter of course. On the other hand, those cis-dichloroplatinum(II) complexes that are known to have anticancer activity, such as cis-dichloro(1,2-diaminocyclohexane)platinum(II), cis-dichloro(2-aminomethylpyridine)platinum(II) and cis-dichlorobis(cyclopentylamine)platinum(II), are still less water-soluble than cisplatin. Accordingly, a number of investigations have been conducted in various countries to find out platinum complex anticancer agents free from such drawbacks of cis-dichloroplatinum(II) complexes and, as a result, there have been developed, for example, 1,1-cyclobutanedicarboxylatodiammineplatinum(II) (carboplatin by generic name), cis-dichloro-transdihydroxobis(isopropylamine)platinum-(IV), R-1,1-cyclobutanedicarboxylato(2-aminomethylpyrrolidine)platinum(II), (glycolato-O,O')-diammineplatinum(II), 1,1-cyclobutanedicarboxylato( 2-methyl-1,4-butanediamine)platinum(II) and oxalato(1R,2R-cyclohexanediamine)platinum(II).

It has also been reported that compositions containing coupling products between organic macromolecules having a molecular weight of 5,000–60,000, such as polyamino acids and anionic polysaccharides, and platinum or palladium complexes are suited for use in the treatment of tumors and for the treatment and prevention of trypanosomiasis (cf. Japanese Kokai Tokkyo Koho No. 59-116221).

The platinum complexes mentioned above can hardly be said to be satisfactory with respect to reduction in side-effects, indications and water-solubility, among others. For the reasons mentioned above, it is difficult to expect that some novel anticancer agent free from various drawbacks as mentioned above would be born from among low-molecular platinum complexes.

The above-mentioned compositions can hardly be said to be satisfactory in terms of anticancer activity, toxicity and/or solubility in water.

Accordingly, it is an object of the invention to provide a novel water-soluble compound which shows side-effects to a less extent, is broader in anticancer spectrum and has better anticancer activity as compared with the conventional platinum complex anticancer agents.

Another object of the invention is to provide a process for producing said novel compound.

A further object of the invention is to provide a pharmaceutical composition containing said novel compound as well as a method of treating cancer which comprises administering said novel compound.

DISCLOSURE OF THE INVENTION

In accordance with the present invention, the above objects are accomplished by providing:

(1) a pullulan derivative having one or more active sites resulting from introduction of sulfuric acid, phosphoric acid, a sulfonic acid or a carboxylic acid, wherein one hydrogen atom of the group of the formula

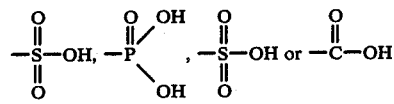

occurring at said active sites is partly substituted by a group of the general formula

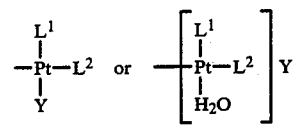

wherein $L^1$ and $L^2$ each independently is ammine or a unidentate ligand amine or combinedly represent a bidentate ligand amine and Y is an anionic ligand, and/or two hydrogen atoms of the group

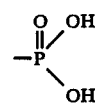

or of two

groups bound to one and the same carbon atom or to two neighboring carbon atoms as occurring at said active sites are, each independently, partly substituted by a group of the general formula

wherein $L^1$ and $L^2$ are as defined above, and/or a pharmacologically acceptable salt thereof (hereinafter these compounds are referred to as "macromolecular complexes");

(2) a process for producing a pullulan derivative having one or more active sites resulting from introduction of sulfuric acid, phosphoric acid, a sulfonic acid or a carboxylic acid, wherein one hydrogen atom of the group of the formula

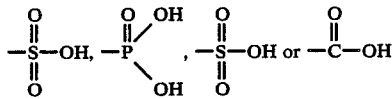

occurring at said active sites is partly substituted by a group of the general formula

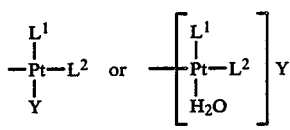

wherein $L^1$, $L^2$ and Y are as defined above, and/or two hydrogen atoms of the group

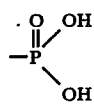

or of two

groups bound to one and the same carbon atom or to two neighboring carbon atoms as occurring at said active sites are, each independently, partly substituted by a group of the general formula

wherein $L^1$ and $L^2$ are as defined above, and/or a salt thereof which comprises reacting pullulan with a reagent capable of introducing sulfuric acid, phosphoric acid, a sulfonic acid or a carboxylic acid into pullulan, then reacting the thus-obtained activated pullulan with a cis-platinum(II) complex of the general formula

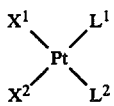

wherein $L^1$ and $L^2$ are as defined above and $X^1$ and $X^2$ each is nitrato or hydroxo or combinedly represent sulfato, to obtain a pullulan derivative having one or more active sites resulting from introduction of sulfuric acid, phosphoric acid, a sulfonic acid or a carboxylic acid, wherein one hydrogen atom of the group of the formula

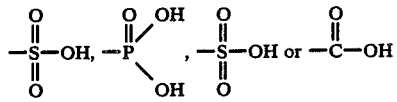

occurring at said active sites is partly substituted by a group of the general formula

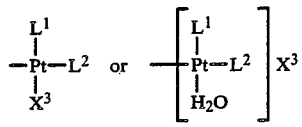

wherein $L^1$ and $L^2$ are as defined above and $X^3$ is nitrato or hydroxo or sulfato (said sulfato being the remainder sulfato resulting from binding of one of $X^1$ and $X^2$ to the activated pullulan), and/or two hydrogen atoms of the group

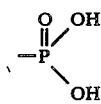

or of two

groups bound to one and the same carbon atom or to two neighboring carbon atoms as occurring at said active sites are, each independently, partly substituted by a group of the general formula

wherein $L^1$ and $L^2$ are as defined above, and/or a salt thereof, and, as required, reacting the thus-obtained pullulan derivative and/or a salt thereof with an anion-forming compound, to obtain a pullulan derivative having one or more active sites resulting from introduction of sulfuric acid, phosphoric acid, a sulfonic acid or a carboxylic acid, wherein one hydrogen atom of the group of the formula

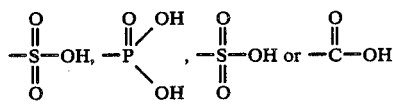

occurring at said active sites is partly substituted by a group of the general formula

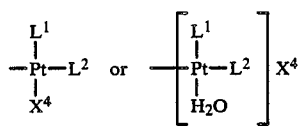

wherein L¹ and L² are as defined above and X⁴ is an anionic ligand, and/or two hydrogen atoms of the group

or of two

groups bound to one and the same carbon atom or to two neighboring carbon atoms as occurring at said active sites are, each independently, partly substituted by a group of the general formula

wherein L¹ and L² are as defined above, and/or a salt thereof;

(3) a pharmaceutical composition comprising a therapeutically effective amount of at least one of the macromolecular complexes and a pharmaceutically acceptable carrier therefor, (4) an anticancer agent containing at least one of the macromolecular complexes as active ingredients, and (5) a method of treating cancer which comprises administering a therapeutically effective amount of at least one of the macromolecular complexes.

L¹ and L² appearing in the above formulas are now described in further detail. As the unidentate amine represented by each of L¹ and L², there may be mentioned n-propylamine, n-butylamine, n-hexylamine, n-octylamine, isopropylamine, isopentylamine, oxo-2-aminonorbornane, cyclopropylamine, cyclobutylamine, cyclopentylamine, cyclohexylamine, cycloheptylamine, aniline, alanine and glycine, among others. As the bidentate amine formed combinedly by L¹ and L², there may be mentioned 1,2-diaminocyclopentane, 1,2-diaminocyclohexane, 1,2-diaminocycloheptane, 1,2-diaminocyclooctane, 1-amino-1-aminomethylcyclohexane, 1-amino-1-aminomethylcyclopentane, 1-amino-1-aminomethylcyclooctane, 1-amino-2-aminomethylcyclohexane, 1-amino-2-aminomethyl-3,3,5-trimethylcyclopentane, 1,1-bis(aminomethyl)cyclohexane, 1,2-diaminoadamantane, exo-cis-2,3-diaminobicyclo[2.2.1]heptane, o-phenylenediamine, ethylenediamine, 1,2-dicarboxyethylenediamine, 1,2-bis(4-hydroxyphenyl)ethylenediamine, 1,2-bis(3,4-dimethoxyphenyl)ethylenediamine, 1,2-bis(4-methoxyphenyl)ethylenediamine, N,N'-dimethylethylenediamine, N,N'-diethylethylenediamine, N-ethylethylenediamine, 1,2-diaminopropane, 1,2-diamino-2-methylpropane, 1,2-diamino-2-ethylpropane, 1,2-diamino-2-isobutylpropane, 1,2-diamino-2-methylbutane, 1,2-diamino-2-ethylbutane, 1,3-diaminobutane, 1,3-diaminopentane, 2,4-diaminopentane, 1,3-diamino-1,3-diphenylpropane, 1,3-diamino-2-methyl-2-ethylpropane, 2-methyl-1,4-butanediamine, 1,3-diamino-2,2-dibenzylpropane, s-stilbenediamine, 2-aminomethylpyridine, 2-(1-aminoethyl)pyridine, 2-(methylaminomethyl)pyridine, 2-aminomethylpiperidine, N-(2-aminoethyl)piperidine, 2-aminomethylpyrrolidine, 2-(1-aminoethyl)pyrrolidine, N-ethyl-2-aminomethylpyrrolidine, N-(2-aminoethyl)pyrrolidine, and the like. These bidentate amines include geometrical or optical isomers thereof when such isomers exist. As the anionic ligand represented by each of Y and X⁴, there may be mentioned, for example, hydroxo, nitrato, nitro, sulfato, ethylsulfato, sulfito, chloro, bromo, iodo, carbonato, hydrogencarbonato, phosphato, methylphosphonato, borato, tetraborato, n-butylboronato, sulfamato, bromato, chromato, manganato, methanesulfonato, acetato, monobromoacetato, monochloroacetato, acetoacetato, pyruvato, lactato, glucuronato, gluconato, oxalato, malonato, succinato and benzoato.

As the pharmacologically acceptable salts, which are included among the macromolecular complexes according to the invention, there may be mentioned, for example, salts with alkali metals such as sodium and potassium; salts with alkaline earth metals such as calcium and barium; and salts with tertiary amines such as pyridine, triethylamine and tri-n-butylamine.

The macromolecular complexes according to the invention can be produced in accordance with the above-mentioned process, which may be represented schematically in terms of reaction formulas as follows (pullulan being represented by ⅂P—OH, and the activated pullulan obtained by partial introduction of sulfuric acid, phosphoric acid, a sulfonic acid or a carboxylic acid onto hydroxyl groups of pulluian being represented by ⅂P—O—(A)):

(1) When the activated pulluian as obtained of partial introduction of sulfuric acid, a sulfonic acid or a carboxylic acid into pulluian, each active site of which has one of the group

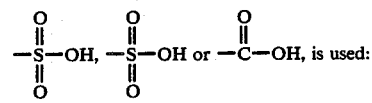

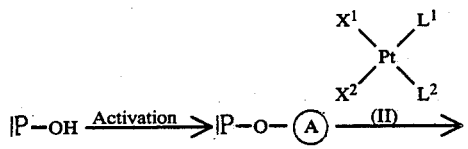

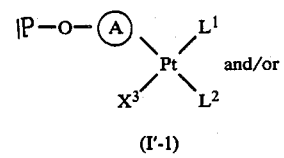

(I'-1)

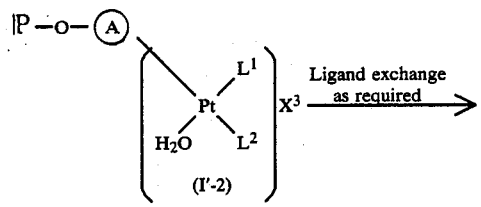

(I'-2)

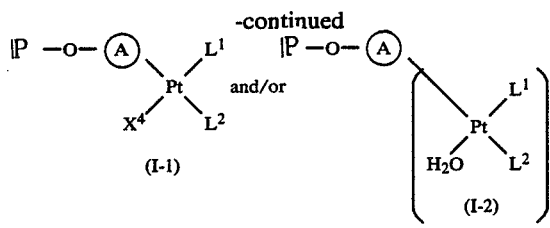

(2) When the activated pulluian as obtained by partial introduction of phosphoric acid or a carboxylic acid into pullulan, each active site of which has a group

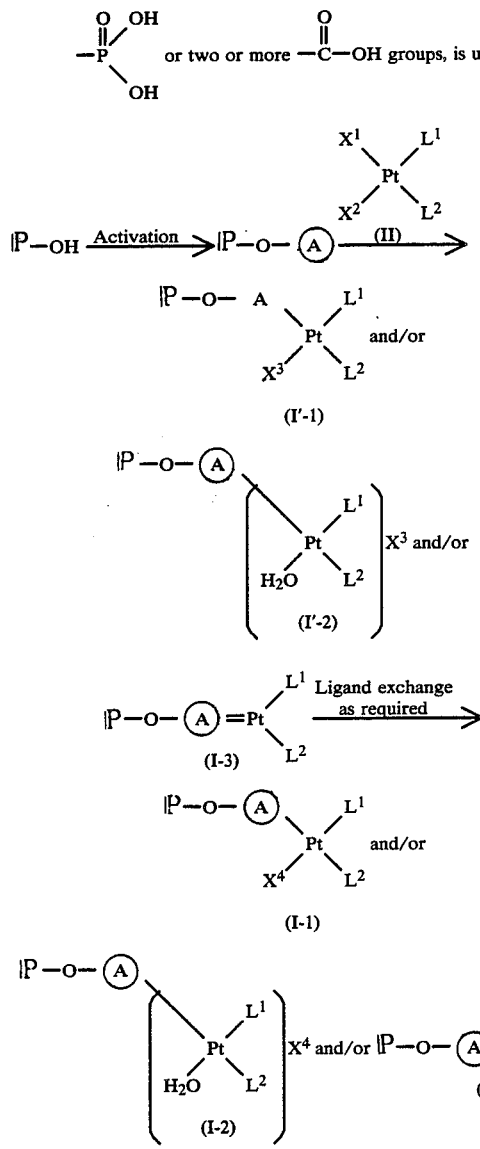

In the above formulas, $L^1$, $L^2$, $X^1$, $X^2$, $X^3$ and $X^4$ are as defined above. The general formulas (I'-1), (I'-2) and (I-3) represent the macromolecular complexes according to the invention as obtained as a result of partial reaction of the respective activated pullulan species with a cis-platinum(II) complex of general formula (II), while the general formulas (I-1) and (I-2) represent the macromolecular complexes according to the invention as obtained by subjecting the macromolecular complex of general formula (I'-1) and the macromolecular complex of general formula (I'-2), respectively, to ligand exchange as required. The general formulas (I-2) and (I'-2) represent those macromolecular complexes that are supposedly formed in the respective reactions or in the step of separation and purification to be mentioned later herein in which water is used. The sites of Pt binding to activated pullulan are represented by

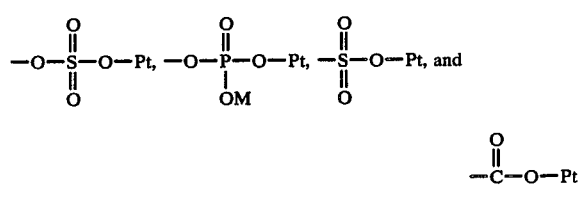

$$-\overset{O}{\underset{C}{\|}}-O-Pt$$

corresponding to the introduction of sulfuric acid, phosphoric acid, a sulfonic acid and a carboxylic acid, respectively (M being a hydrogen atom or the metal atom or salt-forming group corresponding to the salt of the starting pullulan phosphate).

The above-mentioned process is now described in more detail. The reaction of activated pullulan with a cis-platinum(II) complex represented by the general formula (II) is generally carried out in the presence of a solvent such as water or N,N-dimethylformamide, preferably in an aqueous medium. While the reaction is generally carried out at room temperature, heating up to about 80° C. may be employed to thereby increase the reaction efficiency. The necessary reaction period may vary depending on the reaction temperature employed but generally it takes several hours to 2 days for the reaction to be complete. The activated pullulan and cis-platinum(II) complex are reacted with each other in an optional quantity ratio selected depending on the extent of activation of pullulan, the molecular weight of the cis-platinum(II) complex, the dosage form of the desired macromolecular complex as anticancer agent, and other factors but, generally, they are used in an activated pullulan/cis-platinum(II) complex weight ratio within the range of about 1/0.05 to about 1/3. The use of the cis-platinum(II) complex in an increased amount results in an increased content of platinum bound to the activated pullulan. The desired macromolecular complex can be obtained by subjecting the reaction mixture from the activated pullulan and the cis-platinum(II) complex of general formula (II) directly to the separation/purification process to be mentioned later herein. For replacing the ligand of the cis-platinum(II) complex bound to the activated pullulan with some other ligand as required, an anion-forming compound is further added to the reaction mixture obtained in the above manner, or an anion-forming compound is added, in the presence of an aqueous solvent, to the macromolecular complex once separated from the reaction mixture and, in either case, the resulting mixture is stirred at room temperature for several hours to 1 day. As the anion-forming compound, there may be mentioned, among others, alkali metal salts, alkaline earth metal salts and ammonium salts of inorganic acids such as bicarbonic acid, carbonic acid, boric acid, sulfurous acid, nitrous acid, hydrochloric acid, sulfuric acid, nitric acid, phosphoric acid, bromic acid, hydrobromic acid, hydroiodic acid, chromic acid, manganic acid and tetraboric acid as well as alkali metal salts, alkaline earth metal salts and ammonium salts of organic acids such as acetic acid, bromoacetic acid, chloroacetic acid, succinic acid, maleic acid, malonic acid, oxalic acid, benzoic acid, glucuronic acid, gluconic acid, pyruvic acid, lactic acid, acetoacetic acid, methanesulfonic acid, ethylsulfuric acid, methanephosphoric acid, butylboric acid and sulfamic acids. As representatives among them, there may be mentioned sodium bicarbonate, ammonium bicarbonate, sodium chloride, potassium bromide, sodium acetate, sodium glucuronate, sodium pyruvate and sodium monochloroacetate. As hydroxy anion-forming compounds, there may be mentioned, for example, barium hydroxide, potassium hydroxide, sodium hydroxide and aqueous ammonia. The amount of the above-mentioned anion-forming compound to be added is about 1 to about 20 moles/mole of the reactant cis-platinum(II) complex of general formula (II), although said amount may vary depending on the kind of activated pullulan and the kind of anion-forming compound.

The procedure for separation and purification of the macromolecular complex from the reaction mixture thus obtained is now described in detail. Low molecular substances such as unreacted cis-platinum(II) complex and/or the excess of the anion-forming compound added for ligand exchange are removed from the reaction mixture by dialysis, gel filtration, reprecipitation, ultrafiltration, etc. The macromolecular complex-containing solution obtained after such procedure is concentrated to an appropriate extent and the concentrate is subjected to reprecipitation treatment using methanol, isopropanol or a mixed solvent composed of these, or the solution as it is is lyophilized, whereby the macromolecular complex can be obtained as a solid. In the above-mentioned dialysis, ultrafiltration and gel filtration, water is used as the solvent or eluent.

As mentioned above, the macromolecular complexes according to the invention which can be obtained in the above manner have an anion and/or aqua as a ligand. It is not necessary that one and the same molecule has only one kind of ligand. The macromolecular complexes according to the invention include those having different ligands partly. The macromolecular complexes according to the invention further include those of the following types. Thus, those macromolecular complexes according to the invention which are obtained by reaction of an activated pullulan as activated by introduction of a polybasic acid having three or more carboxyl groups with a cis-platinum(II) complex of general formula (II), when said activated pullulan carried two localized carboxyl groups, for example two carboxyl groups bound to one and the same carbon atom or to two neighboring carbon atoms, include macromolecular complexes resulting from intramolecular binding of the cis-platinum(II) complex to said two carboxyl groups. For instance, those macromolecular complexes which are obtained as a result of reaction of pullulan cis,cis,cis,cis-1,2,3,4-cyclopentanetetracarboxylate with a cis-platinum(II) complex of general formula (II) include macromolecular complexes of the formula given below:

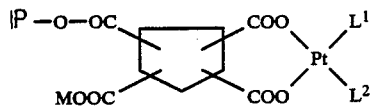

wherein M is a metal atom or a salt-forming group.

Those macromolecular complexes according to the invention which are obtained by reaction of an activated pullulan resulting from introduction of phosphoric acid with a cis-platinum(II) complex of general formula (II) include macromolecular complexes of the following formula:

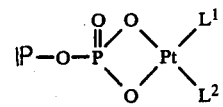

The macromolecular complexes according to the invention contain the platinum atom in an amount within the range of about 0.1–20% by weight although the platinum content may vary depending on the kind of activated pullulan. To be capable of producing the desired pharmacological effect to a satisfactory extent and to be sufficiently soluble in water, hence readily administrable to living bodies, the macromolecular complexes should preferably have a platinum content wihtin the range of about 1–15% by weight, more preferably within the range of about 3–10% by weight. The platinum content of the macromolecular complexes can be determined by atomic absorption spectrophotometry.

The macromolecular complexes according to the invention have a molecular weight (weight-average molecular weight) of several thousand to about one million. The molecular weight of the macromolecular complexes may be selected within the above range depending on the purpose of their use. When the macromolecular complexes are administered to a tumor tissue locally or into the nutrient artery, the complexes should preferably give an appropriate degree of viscosity when dissolved in a solvent and have a tendency toward local retention. Their molecular weight is suitably within the range of 100,000–800,000, preferably within the range of 300,000–600,000. When they are administered intravenously, the macromolecular complexes suitably have a molecular weight within the range of 10,000–300,000, preferably within the range of 30,000–200,000, particularly preferably within the range of 60,000–150,000, from the viewpoint of adequate maintenance of the blood concentration of the macromolecular complexes and of reduction of their in vivo accumulability. Whereas many of the known platinum complex anticancer agents are hardly soluble in water, the macromolecular complexes according to the invention, when they have a molecular weight within the range of several thousand to about 10,000, can be used for the purpose of their use merely as water-soluble anticancer agents.

The cis-platinum(II) complexes of general formula (II) can be produced by a conventional method. Thus, those nitratoplatinum complexes in which $X^1$ and $X^2$ in general formula (II) are each nitrato can be obtained by reacting a cis-dichloroplatinum(II) complex of the general formula

wherein $L^1$ and $L^2$ are as defined above, with 2 equivalents of silver nitrate. This reaction is generally carried out in water as a solvent at a temperature within the range of from room temperature to about 80° C. Thereafter, the resulting silver chloride precipitate is removed from the reaction mixture, and the aqueous solution obtained can be used as it is for the reaction for forming the macromolecular complexes according to the invention. This aqueous solution is acidic, when required, it can be submitted to the macromolecular complex formation reaction after pH adjustment with aqueous ammonia or aqueous sodium hydroxide solution. It is also possible to isolate the nitratoplatinum complexes as crystals by distilling off water under reduced pressure from the aqueous solution after removal of the precipitate silver chloride. In this case, the nitratoplatinum complexes obtained contain 2 molecules of water of crystallization.

The aqueous solution of nitratoplatinum complex obtained by the above method, when passed through an anion exchange resin, such as Diaion SA-10A, Amberlite IRA-400 or Dowex I, gives an alkaline aqueous solution of the corresponding hydroxoplatinum complex in which $X^1$ and $X^2$ in general formula (II) are each hydroxo. Since such a hydroxoplatinum complex is very unstable when isolated in the solid form, the aqueous solution is submitted as it is to the reaction for forming the macromolecular complexes according to the invention.

Furthermore, when the cis-dichloroplatinum complex of general formula (III) is reacted with 1 equivalent of silver sulfate in an aqueous solvent and the resulting silver chloride is removed from the reaction mixture, there is obtained an aqueous solution of the corresponding sulfatoplatinum complex in which $X^1$ and $X^2$ in general formula (II) combinedly represent sulfato. It is further possible to obtain an aqueous solution of the above-mentioned hydroxoplatinum complex by adding barium hydroxide to said aqueous solution of sulfatoplatinum complex and removing the resulting barium sulfate precipitate from the reaction mixture.

The starting material pullulan is commercially available at low price as a fermentation product from a partial hydrolyzate of starch. According to a report [cf. J. Synth. Org. Chem. Japan, 42, No. 6, 587 (1984)], pullulan species differing in molecular weight from several thousand to 760,000 can be obtained with a very narrow molecular weight distribution ($\overline{Mw}/\overline{Mn}$). Pullulan is an unbranched, linear macromolecular polysaccharide composed of maltotriose (consisting of three glucose units) units linked through α-1,6 bonds, and it is readily soluble in water.

The methods of producing activated pullulan species are now described.

Production of activated pullulan by introduction of sulfuric acid

Chlorosulfonic acid, fuming sulfuric acid and sulfur trioxide, for instance, are used as reagents for introducing sulfuric acid into pullulan. In introducing sulfuric acid into pullulan, the method which employs chlorosulfonic acid is preferable since said method does not cause significant change in the molecular weight and molecular weight distribution of pullulan used. This method comprises dissolving pullulan in N,N-dimethylformamide, adding a small amount of pyridine to the solution and adding dropwise chlorosulfonic acid at temperature under ice cooling to room temperature. By subjecting the reaction mixture to reprecipitation treatment using such a solvent as methanol or isopropanol, there can be obtained pullulan sulfate. As mentioned later herein, the pullulan sulfate is preferably converted to the pullulan sulfate salt form by using a base. Chlorosulfonic acid is charged in an amount within the range of about 0.2–5 moles per monosaccharide unit in pullulan, although the charge amount may vary depending on the reaction conditions.

PRODUCTION OF ACTIVATED PULLULAN BY INTRODUCTION OF PHOSPHORIC ACID

Phosphorus pentoxide, urea-orthophosphoric acid, phosphoric acid and the like are used as reagents for introducing phosphoric acid into pullulan. To increase the extent of introduction of phosphoric acid into pullulan, the use of phosphorus pentoxide is preferred. The introduction of phosphoric acid into pullulan is realized by dissolving pullulan in methanesulfonic acid or a mixed solvent composed of methanesulfonic acid and N,N-dimethylformamide and adding phosphorus pentoxide to the solution at temperature under ice cooling to room temperature. When methanesulfonic acid is used as a solvent in carrying out the reaction, pullulan phosphate can be obtained by subjecting the reaction mixture obtained to reprecipitation treatment using diethyl ether. When a mixed solvent composed of methanesulfonic acid and N,N-dimethylformamide is used, pullulan phosphate can be recovered by subjecting the reaction mixture obtained to reprecipitation treatment using methanol or isopropanol. Since pullulan phosphate itself is lacking in stability, it is preferable to convert it to a salt form of pullulan phosphate by using a base as mentioned later herein. Phosphorus pentoxide is used in an amount within the range of about 0.2–3 moles per monosaccharide unit in pullulan although the charge amount may vary depending on the reaction conditions.

PRODUCTION OF ACTIVATED PULLULAN BY INTRODUCTION OF A SULFONIC ACID

Halogen-containing aliphatic or aromatic sulfonic acids in their sodium salt form, such as sodium 2-chloroethanesulfonate, sodium 2-bromoethanesulfoante, sodium 4-chlorobutanesulfonate and sodium p-bromomethylbenzenesulfonate, and propane sultone, among others, are used as reagents for the sulfonic acid introduction. The use of a sulfonic acid sodium salt is common in introducing sulfonic acid into pullulan. According to this method, the reaction of pullulan with a sulfonic acid sodium salt is carried out in a solvent, such as water, isopropanol, N,N-dimethylformamide or dimethyl sulfoxide, in the presence of a hydrogen halide acceptor, such as sodium hydroxide, potassium hydroxide, potassium carbonate or 1,8-diazabicyclo[5.4.0]-7-undecene. The reaction is conducted at room temperature to temperature under heating up to about 120° C. for a period of several hours to 1 day depending on the reaction temperature This method, when carried out by reacting a sulfonic acid sodium salt with pullulan in an aqueous solution of sodium hydroxide with stirring at a temperature of about 100°–110° C. in a nitrogen atmosphere for about 2–6 hours, generally gives good results, although the results may depend on the kind of sulfonic acid sodium salt. The raw material sulfonic acid sodium salt is used in an amount of about 0.5–7 moles per monosaccharide unit in pullulan although the charge amount may vary depending on the reaction conditions.

PRODUCTION OF ACTIVATED PULLULAN BY INTRODUCTION OF A CARBOXYLIC ACID

The introduction of carboxylic acid into pullulan is carried out by the following two methods: (1) the method comprising causing one carboxyl group of a polybasic acid having two or more carboxyl groups or the anhydride thereof as used as the reagent for carboxylic acid introduction to be bound to the hydroxyl group of pullulan via ester bonding and (2) the method comprising causing a halogen atom-containing aliphatic or aromatic carboxylic acid as used as the reagent for carboxylic acid introduction to be bound to the hydroxyl group of pullulan via ether bonding resulting from hydrogen halide elimination.

When the polybasic acid is used in the form of carboxylic acid anhydride in carrying out method (1), the reaction is conducted in a solvent such as water, N,N-dimethylformamide or dimethyl sulfoxide. When water is used as the solvent, the reaction is suitably performed in the presence of the base such as sodium bicarbonate, potassium carbonate, sodium hydroxide, barium hydroxide or aqueous ammonia. This mode is particularly suitable for avoiding intermolecular crosslinking in carrying out the reaction using a polybasic acid anhydride having a plurality of anhydride rings. When N,N-dimethylformamide, dimethyl sulfoxide or the like is used as the solvent, the reaction is suitably conducted in the presence of a tertiary amine such as pyridine or triethylamine, or anhydrous sodium acetate. This mode is particularly suitable for the reaction using a polybasic acid anhydride having one anhydride ring but is not favorable for the reaction using a polybasic acid anhydride having a plurality of anhydride rings because intermolecular crosslinking takes place. In either mode, the reaction is conducted at temperature under ice cooling to temperature under heating up to about 80° C. Generally, however, it is convenient to perform the reaction at room temperature or in the vicinity thereof. A period of several hours to 1 day is sufficient for the reaction. The polybasic acid anhydride is used in an amount within the range of about 0.1–5 moles per monosaccharide unit in pullulan although the amount to be charged may vary depending on the solvent species used in carrying out the reaction. When the polybasic acid is used as it is in carrying out method (1), the reaction is carried out in the manner of condensation in a solvent, such as N,N-dimethylformamide or dimethyl sulfoxide, in the presence of a conventional esterification catalyst with heating. For the purpose of avoiding intermolecular crosslinking, it is advisable to protect other carboxyl group or groups of the polybasic acid than the carboxyl group to be bound to pullulan by a conventional method prior to submitting said acid to reaction. It is also advisable to activate the carboxyl group to be bound to pullulan by converting the same to the form of acid chloride or mixed anhydride with some other carboxylic acid, for instance. As typical examples of the polybasic acid or anhydride thereof to be used in carrying out method (1), there may be mentioned succinic acid, maleic acid, citraconic acid, benzylsuccinic acid, glutaric acid, phthalic acid, cis-1,2-cyclohexanedicarboxylic acid, cis-aconitic acid, 1,2,3-propanetricarboxylic acid, butane-1,2,3,4-tetracarboxylic acid, 1,1,2,3-propanetetracarboxylic acid, trimellitic acid, pyromellitic acid, tetrahydrofuran-2,3,4,5-tetracarboxylic acid, 1,2,3,4-cyclopentanetetracarboxylic acid and anhydrides thereof; L-aspartic acid anhydride, L-glutamic acid anhydride; malonic acid, fumaric acid, diglycolic acid, 2,2'-thiodiglycolic acid, 3-hydroxy-3-methylglutaric acid, (ethylenedithio)diacetic acid, N-methylglutamic acid, glutamic acid and so forth.

As typical examples of the halogen atom-containing aliphatic or aromatic carboxylic acid to be used in method (2), there may be mentioned monochloroacetic acid, monobromoacetic acid, β-chloropropionic acid, 5-chloro-n-valeric acid, bromomethylmaleic acid, p-bromomethylbenzoic acid, 3-bromomethylphthalic acid and so forth. The reaction of these carboxylic acids with pullulan is carried out in the same manner as in carrying out the above-mentioned method employed for activated pullulan production by sulfonic acid introduction.

Various acids as introduced into pullulan in the above manner for activation of pullulan occur either in the free form or in a salt form depending on the method of pullulan activation. The term "activated pullulan" as used herein means that the acid introduced is in either of both states. Generally, from the viewpoint of stability of the activated pullulan and the viewpoint of reactivity with the cis-platinum(II) complex of general formula (II), it is in some instances preferable to use the activated pullulan in a state such that the acid introduced thereinto occurs in a salt state. When necessary, free acid moiety-containing activated pullulan species are treated with a base, for example an alkali metal hydroxide such as sodium hydroxide or potassium hydroxide, an alkaline earth metal hydroxide such as calcium hydroxide or barium hydroxide, aqueous ammonia, or a tertiary amine such as pyridine, triethylamine or tri-n-butylamine, whereby the free acid moieties of said activated pullulan species are converted to the corresponding salt moieties.

The macromolecular complexes according to the invention have potent anticancer activity originating from the cis-platinum(II) complex of general formula (II) as well as properties of the activated pullulan and have the following characteristic features: The macromolecular complexes according to the invention are easily soluble in water, hence are not restricted at all with respect to the method of administration, since they have a structure such that the activated pullulan, which is soluble in water and the cis-platinum(II) complex of general formula (II) are bound to each other in the form of IP —O—(A)—Pt, as mentioned hereinbefore. When administered to a living organism, the macromolecular complexes according to the invention gradually release the platinum complex in the form of an active species in the organism. As a result, an effective blood concentration of such active species is maintained for a prolonged period of time and at the same time the toxicity of said species is reduced, so that the therapeutic indices of the macromolecular complexes according to the invention are very much improved. Furthermore, the macromolecular complexes according to the invention are significantly improved with respect to such nephrotoxicity as caused by cisplatin and to such thrombocytopenia as induced by carboplatin. In addition, since solid tumors have such features as vascularization, vascular permeability and leakage from the blood vessel, the macromolecular complexes according to the invention are readily accumulated in tumor tissues without significantly affecting normal tissues. Furthermore, the macromolecular complexes according to the invention do not undergo association or crystallization. They are retained in the blood circulation system for a certain period of time and thereafter excreted through the kidney as a reuslt of in vivo metabolism of the principal chain of pullulan, without accumulation in tissues of living organisms. The macromolecular complexes according to the invention also show enhanced lymphatic delivery and are therefore effective in the treatment of metastasized cancer in the lymphatic system. Accordingly, the macromolecular complexes according to the invention have an extended or modified anticancer spectrum as compared with the known low-molecular-weight platinum complex anticancer agents. They have potentiated anticancer activity but do not cause severe side effects.

In the following, the results of testing in mice of the macromolecular complexes according to the invention, with cisplatin as a control, for anticancer activity against experimental tumors and for nephrotoxicity are shown.

TEST EXAMPLE 1

Anticancer activity against mouse tumor L1210 leukemia (1) Test by intraperitoneal administration L1210 cells were intraperitoneally transplanted into CDF$_1$ mice (6 weeks of age, male, 6 animals/group) $10^5$ cells/animal) and the test substances dissolved in distilled water for injection were intraperitoneally administered one day after transplantation. The anticancer effect was evaluated in terms of the ratio, T/C (%), of the survival time in days in each treated group to the survival time in days in the untreated group. When this value was 125% or more, the substance tested was regarded as effective. The mean survival time in the untreated group was about 8 days. Those animals that were alive on day 30 were laparotomized and examined for whether the cancer had been cured completely or not. The results thus obtained are shown in Table 1.

The control drug cisplatin was administered as an aqueous suspension using the surfactant Tween 80.

TABLE 1

| Substance tested | Dose (mg/kg) | Dose as platinum (mg/kg) | T/C* (%) | Cured mice** |
|---|---|---|---|---|
| Macromolecular complex obtained in Example 1 | 200 | 19.2 | 106 | |
| | 100 | 9.6 | 200 | 2/6 |
| | 50 | 4.8 | 285 | 3/6 |
| Macromolecular complex obtained in Example 4 | 200 | 7.0 | 0 | |
| | 100 | 3.5 | 291 | 3/6 |
| | 50 | 1.8 | 164 | |
| Macromolecular complex obtained in Example 13 | 25 | 2.5 | 196 | 1/6 |
| | 12 | 1.2 | 164 | |
| | 6 | 0.6 | 158 | |
| Macromolecular complex obtained in Example 21 | 400 | 20.0 | 181 | 1/6 |
| | 200 | 10.0 | 115 | |
| | 100 | 5.0 | 112 | |
| Macromolecular complex obtained in Example 28 | 200 | 12.4 | 0 | |
| | 100 | 6.2 | 158 | |
| | 50 | 3.1 | 116 | |
| Macromolecular complex obtained in Example 29 | 100 | 10.4 | 0 | |
| | 50 | 5.2 | 180 | |
| | 25 | 2.1 | 162 | |
| Macromolecular complex obtained in Example 34 | 200 | 10.2 | 0 | 1/6 |
| | 100 | 5.1 | 253 | 3/6 |
| | 50 | 2.6 | 170 | |
| Macromolecular complex obtained in Example 38 | 50 | 1.6 | 180 | 1/6 |
| | 25 | 0.8 | 131 | |
| | 12 | 0.4 | 113 | |
| Macromolecular complex obtained in Example 40 | 200 | 12.0 | 228 | 2/6 |
| | 100 | 6.0 | 125 | |
| | 50 | 3.0 | 112 | |
| Macromolecular complex obtained | 200 | 6.2 | 0 | |
| | 100 | 3.1 | 197 | 1/6 |

TABLE 1-continued

| Substance tested | Dose (mg/kg) | Dose as platinum (mg/kg) | T/C* (%) | Cured mice** |
|---|---|---|---|---|
| in Example 44 | 50 | 1.6 | 231 | 2/6 |
| Macromolecular complex obtained in Example 49 | 200 | 7.6 | 0 | 1/6 |
| | 100 | 3.8 | 175 | 1/6 |
| | 50 | 1.9 | 235 | 1/6 |
| Macromolecular complex obtained in Example 62 | 200 | 10.0 | 106 | 1/6 |
| | 100 | 5.0 | 343 | 5/6 |
| | 50 | 2.5 | 171 | |
| Macromolecular complex obtained in Example 64 | 200 | 3.2 | 150 | |
| | 100 | 1.6 | 154 | |
| | 50 | 0.8 | 128 | |
| Cisplatin | 12 | 7.8 | 146 | |
| | 6 | 3.9 | 128 | |
| | 3 | 2.0 | 135 | |

*T/C = 0% means that three or more mice died in 5 days after transplantation due to the toxicity of the test compound.
**The number of mice cured of cancer in a group of 6 mice.

(2) Test by intraveneous administration

L1210 cells were intraperitonally transplanted into CDF$_1$ mice (6 weeks of age, male, 6 animals/group) ($10^5$ cells/animal) and then the test substances dissolved in distilled water for injection were administered via the tail vein one day and five days after transplantation. The control drug cisplatin was administered as a solution in 1% aqueous mannitol solution. The anticancer effect was expressed in the same manner as in the case of testing by intraperitoneal administration as described in (1). The results obtained are shown in Table 2.

TABLE 2

| Substance tested | Dose (mg/kg) | Dose as platinum (mg/kg) | T/C* (%) | Cured mice** |
|---|---|---|---|---|
| Macromolecular complex obtained in Example 6 | 300 | 12.9 | 0 | |
| | 150 | 6.4 | 55 | |
| | 75 | 3.2 | 205 | 1/6 |
| Macromolecular complex obtained in Example 9 | 100 | 5.1 | 51 | |
| | 50 | 2.6 | 237 | 1/6 |
| | 25 | 1.3 | 192 | |
| Macromolecular complex obtained in Example 13 | 25.0 | 2.5 | 208 | |
| | 12.5 | 1.2 | 138 | |
| | 6.2 | 0.6 | 115 | |
| Macromolecular complex obtained in Example 27 | 500 | 18.5 | 148 | |
| | 250 | 9.3 | 165 | |
| | 125 | 4.6 | 129 | |
| Macromolecular complex obtained in Example 34 | 200 | 10.2 | 0 | |
| | 100 | 5.1 | 80 | |
| | 50 | 2.6 | 173 | |
| Macromolecular complex obtained in Example 42 | 400 | 18.8 | 124 | |
| | 200 | 9.4 | 184 | |
| Macromolecular complex obtained in Example 65 | 200 | 9.6 | 72 | |
| | 100 | 4.8 | 209 | 1/6 |
| | 50 | 2.4 | 147 | |
| Cisplatin | 8 | 5.2 | 83 | |
| | 4 | 2.6 | 121 | |
| | 2 | 1.3 | 118 | |
| Macromolecular complex obtained in Comparative Example 1 | 80 | 7.0 | 0 | |
| | 40 | 3.5 | 0 | |
| | 20 | 1.8 | 153 | |

*T/C = 0% means that three or more mice died in 5 days after transplantation due to the toxicity of the test compound.
**The number of mice cured of cancer in a group of 6 mice.

As is evident from Table 1 and Table 2, the macromolecular complexes according to the invention exhibit significant anticancer activity and have potency to cure cancer at high rates. The macromolecular complexes according to the invention are evidently superior in anticancer activity to the control drug cisplatin. Furthermore, the macromolecular complexes according to the invention are soluble in water and, in fact, no troubles were encountered in preparing the dosage form. The macromolecular complex obtained in Comparative Example 1 showed strong toxicity and, in addition, was not satisfactory in anticancer activity.

Nephrotoxicity

The test substance was dissolved in distilled water for injection and administered to ddy strain mice (6 animals/group) through the tail vein at a dose close to the tolerance dose. Four to five days thereafter, blood samples were taken and assayed for urea nitrogen (BUN) levels. The results thus obtained are shown in Table 3.

TABLE 3

| Substance tested | Dose (mg/kg) | BUN (mg/dl) | |
|---|---|---|---|
| Control group | — | 22.8 | |
| Macromolecular complex obtained in Example 2 | 85.0 | 33.9 | Measured 4 days after administration. |
| | 70.0 | 16.0 | Three mice died in 4 days after administration. |
| Macromolecular complex obtained in Example 3 | 71.0 | 18.8 | |
| | 51.0 | 19.5 | |
| Cisplatin | 15.0 | >200 | Measured 5 days after administration. Three mice died in 4 days after administration. |

As is evident from Table 3, the macromolecular complexes according to the invention give markedly decreased BUN values and have very low nephrotoxicity, as compared with the control drug cisplatin.

TEST EXAMPLE 2

Effects on mouse Colon 26 solid tumor

Colon 26 carcinoma cells ($2 \times 10^5$ cells/mouse) were subcutaneously transplanted into $CDF_1$ mice (6 weeks of age, male, 6 animals/group). On the first day and fifth day thereafter, a solution of the test substance in distilled water for injection was administered via the tail vein at a dose of 0.2 ml per mouse. Between the period from the 8th to 19th day after transplantation, the tumor size was measured with a caliper gauge at 3- to 4-day intervals and the tumor weight was estimated according to the formula:

$$\text{Estimated tumor weight} = \tfrac{1}{2} \times (\text{minor axis of tumor})^2 \times (\text{major axis of tumor})$$

The results thus obtained are shown in FIGS. 39 and 40. In FIG. 39, the lines (a), (b), (c) and (d) indicate changes in tumor weight after transplantation in a control group, a group given the macromolecular complex obtained in Example 35 at a dose of 50 mg/kg/administration, a group given the macromolecular complex obtained in Example 35 at a dose of 100 mg/kg/administration and a group given cisplatin at a dose of 3 mg/kg/administration, respectively and, in FIG. 40, the lines (a), (b) and (c) indicate changes in tumor weight in a control group, a group given the macromolecular complex obtained in Example 24 at a dose of 50 mg/kg/administration and a group given cisplatin at a dose of 3 mg/kg/administration, respectively.

TEST EXAMPLE 3

Effects on mouse B16 solid tumor (melanoma)

B16 melanoma cells ($1 \times 10^6$ cells/mouse) were subcutaneously transplanted into $BDF_1$ mice (6 weeks of age, male, 6 animals/group). On the first day and fifth day after transplantation, a solution of the test substance in distilled water for injection was administered to the mice through the tail vein at a dose of 0.2 ml/mouse. During the period from the 13th day to 20th day after transplantation, the tumor size was determined with a caliper gauge at intervals of 3–4 days and the tumor weight was estimated using the formula:

$$\text{Estimated tumor weight} = \tfrac{1}{2} \times (\text{minor axis of tumor})^2 \times (\text{major axis of tumor})$$

The results thus obtained are shown in FIGS. 41, 42 and 43. In FIG. 41, the lines (a), (b), (c) and (d) indicate changes in tumor weight after transplantation in a control group, a group given the macromolecular complex obtained in Example 35 at a dose of 50 mg/kg/administration, a group given the macromolecular complex obtained in Example 35 at a dose of 100 mg/kg/administration and a group given cisplatin at a dose of 3 mg/kg/administration, respectively. In FIG. 42, the lines (a), (b) and (c) indicate changes in tumor weight after transplantation in a control group, a group given the macromolecular complex obtained in Example 24 at a dose of 62.5 mg/kg/administration and a group given cisplatin at a dose of 3 mg/kg/administration, respectively and, in FIG. 43, the lines (a), (b), (c) and (d) indicate changes in tumor weight after transplantation in a control group, a group given the macromolecular complex obtained in a Example 38 at a dose of 37.5 mg/kg/administration, a group given the macromolecular complex obtained in Example 38 at a dose of 75 mg/kg/administration and a group given cisplatin at a dose of 3 mg/kg/administration, respectively.

TEST EXAMPLE 4

Effects on mouse M5076 solid tumor

M5076 fibrosarcoma cells ($1 \times 10^6$ cells/mouse) were subcutaneously transplanted into $BDF_1$ mice (6 weeks of age, male, 6 animals/group). On the first day and 5th day thereafter, a solution of the test substance in distilled water for injection was administered to the mice via the tail vein at a dose of 0.2 ml/mouse. During the period from the 16th day to 37th day after transplantation, the tumor size was measured with a caliper gauge at intervals of 2 to 4 days and the tumor weight was estimated according to the formula:

$$\text{Estimated tumor weight} = \tfrac{1}{2} \times (\text{minor axis of tumor})^2 \times (\text{major axis of tumor})$$

The results thus obtained are shown in FIGS. 44 and 45. In FIG. 44, the lines (a), (b), (c) and (d) indicate changes in tumor weight after transplantation in a control group, a group given the macromolecular complex obtained in Example 35 at a dose of 50 mg/kg/administration, a group given the macromolecular complex obtained in Example 35 at a dose of 75 mg/kg/administration and a group given cisplatin at a dose of 3 mg/kg/administration, respectively and, in FIG. 45, the lines (a), (b) and (c) indicate changes in tumor weight after transplantation in a control group, a group given the macromolecular complex obtained in Example 38 at a dose of 37.5 mg/kg/administration and a group given cisplatin at a dose of 3 mg/kg/administration, respectively.

As is evident from FIGS. 39–45, the macromolecular complexes according to the invention exhibit an excellent tumor growth inhibiting effect on mouse solid tumors. In particular, the macromolecular complexes according to the invention are clearly superior in tumor growth inhibiting effect on mouse solid tumor B16 melanoma to the control drug cisplatin. Furthermore, the macromolecular complexes according to the invention are soluble in water and no troubles were encountered in their administration. No toxicity was observed with respect to the macromolecular complexes according to the invention.

As evidenced above, the macromolecular complexes according to the invention have significant anticancer activity in mammals such as horses, cattle, dogs, mice, rats, guinea pigs and, among others, humans.

The macromolecular complexes according to the invention have also been confirmed to have low toxicity in toxicity testing.

As explained hereinabove, the macromolecular complexes according to the invention are useful as therapeutic agents for cancer in mammals such as horses, cattle, pigs, dogs, mice, rats, guinea-pigs and, among others, humans.

The macromolecular complexes according to the invention can release low-molecular platinum complexes, which are active anticancer species, even under mild conditions and it is presumable that they release such active species as the corresponding platinum monochlorides or dichlorides complex as a result of interaction with, for example, sodium chloride in living organisms. When interactions with various biological components in living organisms are taken into consideration, however, the cleavage of the macromolecular complexes is by no means simple. In any way, the macromolecular complexes according to the invention have various characteristic features, as mentioned above, when compared with the known low-molecular platinum complex anticancer agents, and can be used as novel and excellent macromolecular anticancer agents.

The effective dose of the macromolecular complexes according to the invention can be varied within a broad range depending on various factors such as platinum content in the macromolecular complexes, method of administration, symptoms of the patient to be treated, properties of the cancer to be treated, body weight, age, sex, and judgement of the physician in charge of treatment. In the case of humans, the dose can generally be within the range of about 0.3–20 g/day as expressed in terms of the macromolecular complexes and such dose can be administered in a single dose or several divided doses daily.

The macromolecular complexes according to the invention can be administered to humans and other mammals such as horses, cattle, pigs, dogs, mice, rats and guinea pigs either orally or nonorally. Generally, treatment by nonoral administration is preferred. The macromolecular complexes according to the invention give good results when they are dissolved or suspended in an appropriate solvent for injection, such as distilled water for injection, 1% aqueous sodium bicarbonate solution, 5% aqueous glucose solution, ethanol-containing water, glycerol-containing water or propylene glycol-containing water, and administered by intravenous injection, intramuscular injection, subcutaneous injection or drip infusion, for instance. When required, they can be injected intraarterially or locally into cancer tissues as well. In the latter case, the macromolecular complexes according to the invention, which are macromolecular substances, are apt to be retained locally and release active species gradually over a prolonged period of time, whereby the excellent anticancer effects of the macromolecular complexes of the invention are produced.

Accordingly, the present invention also includes pharmaceutical compositions containing at least one of the above-mentioned macromolecular complexes.

The macromolecular complexes according to the invention can be used in combination of one or more other anticancer agents and, furthermore, can be formulated in combination with various drugs, such as buffers, local anesthetics, hypnotics and analgesics, for providing desired pharmacological properties. While the macromolecular complexes according to the invention can be stored in ampuls in the form of a solution or suspension, it is preferable to store them in ampuls or vials in the form of a powder or lyophilizate and reconstitute an appropriate dosage form prior to use.

MODES FOR CARRYING OUT THE INVENTION

Figure 1:
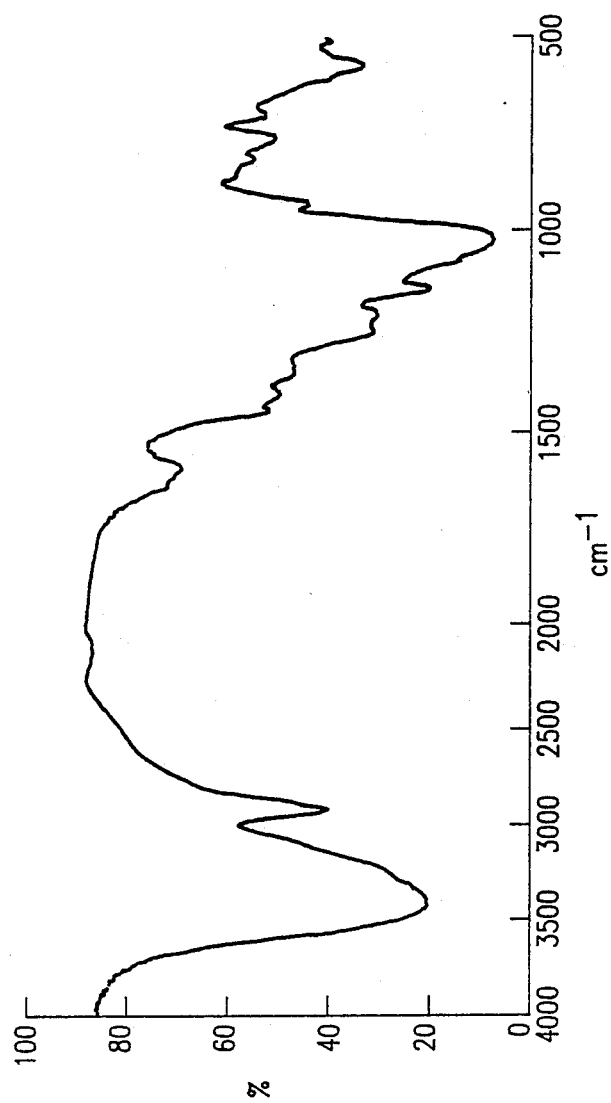
FIGS. 1–38 show infrared absorption spectra (FT-IR) of the macromolecular complexes obtained in Examples 1–5, 7, 9, 13–15, 19–22, 24–26, 28–31, 34, 35, 38, 40, 43, 47, 49–52, 54, 58, 59 and 61–64, which are to be mentioned later herein, respectively. In these figures, the abscissa indicates the wave number ($cm^{-1}$) and the ordinate indicates the transmittance (%).

The following examples are further illustrative of the present invention but should by no means be construed as being limitative of the scope thereof.

Reference Example 1

Pullulan (5.0 g) having a molecular weight of 120,000 ($\overline{Mw}/\overline{Mn}=1.26$) was dissolved in 70 ml of N,N-dimethylformamide with heating at about 60° C., and 5.0 g of pyridine was added to the solution obtained. To this solution was added dropwise with cooling with ice water and stirring 4.3 g of chlorosulfonic acid in a nitrogen atmosphere over about 20 minutes. After completion of the dropping, the mixture was stirred for 1 hour still under cooling with ice water and then stirred at room temperature for 2 hours. The reaction mixture was diluted by addition of 20 ml of N,N-dimethylformamide and the dilution was added dropwise with stirring to about 2 liters of methanol to thereby effect reprecipitation. To the precipitate thus obtained was added 55 ml of about 10% aqueous solution of sodium hydroxide to give a homogeneous solution. This solution was subjected to reprecipitation treatment using about 1.3 liters of methanol. The precipitate obtained was dissolved in about 400 ml of water, the solution was dialyzed for 2 days using a dialysis membrane (tube size 30/32, Union Carbide Corp.), and the dialyzate was lyophilized to give 6.4 g of pullulan sulfate sodium salt.

When treated in the same manner, four pullulan species respectively having molecular weights of 5,000 ($\overline{Mw}/\overline{Mn}=1.11$), 30,000 ($\overline{Mw}/\overline{Mn}=1.28$), 60,000 ($\overline{Mw}/\overline{Mn}=1.24$) and 610,000 ($\overline{Mw}/\overline{Mn}=1.32$) gave the corresponding pullulan sulfate sodium salt species.

Reference Example 2

The procedure of Reference Example 1 was repeated with a modification such that 55 ml of water was added, in lieu of 55 ml of about 10% aqueous sodium hydroxide solution, to the precipitate obtained by subjecting the reaction mixture to reprecipitation. Thus was obtained 6.0 g of pullulan sulfate.

Reference Example 3

Pullulan (10.0 g) having a molecular weight of 60,000 ($\overline{Mw}/\overline{Mn}=1.24$) was added to 200 ml of methanesulfonic acid and the mixture was stirred, with occasional cooling with ice water, for about 3 hours to achieve dissolution. Then, 8.8 g of phosphorus pentoxide was added to the solution and the mixture was stirred for 1 hour with occasional cooling with ice water. The reaction mixture assumed a red-purple color. This reaction mixture was added dropwise to about 2.5 liters of diethyl ether to cause reprecipitation. The precipitate obtained was dissolved in a solution of 10 g of sodium hydroxide in 50 ml of water, and the resultant solution was made alkaline by further addition of 7 g of sodium hydroxide. This solution was then subjected to reprecipitation using about 2 liters of methanol. The precipitate obtained was dissolved in about 20 ml of water and the solution obtained was subjected to reprecipitation with about 2 liters of methanol. This reprecipitation procedure was repeated once more. Thus was obtained 8.0 g of pullulan phosphate sodium salt.

Reference Example 4

Pullulan (6.0 g) having a molecular weight of 60,000 ($\overline{Mw}/\overline{Mn}=1.24$) was dissolved in 120 ml of N,N-dimethylformamide and, then, 90 ml of methanesulfonic acid was added to the solution obtained, to give a homogeneous solution 7.0 g of phosphorus pentoxide was added to the solution, and the mixture was stirred for 3 hours with occasional cooling with ice water and then allowed to stand overnight at room temperature. To the reaction mixture obtained, there was added about 500 ml of an equivolume mixture of methanol and isopropanol. The thus-obtained precipitate was dissolved in 50 ml of water, and the solution was adjusted to pH 7.3 by addition of powdery sodium bicarbonate. This solution was subjected to reprecipitation using about 3 liters of an equivolume mixture of methanol and isopropanol. Two repetitions of this reprecipitation procedure gave 4.1 g of pullulan phosphate sodium salt.

Reference Example 5

Pullulan (5.0 g) having a molecular weight of 120,000 ($\overline{Mw}/\overline{Mn}=1.26$) was added to a solution of 10 g of sodium hydroxide in 20 ml of water and dissolved therein with heating. While the solution obtained was maintained at a temperature of 100°–110° C., 5.0 g of sodium 2-chloroethanesulfonate monohydrate was added in several divided portions to said solution and the resultant mixture was stirred for 4 hours. The reaction mixture obtained was subjected to reprecipitation treatment using about 5 liters of methanol. The precipitate obtained was dissolved in about 400 ml of water and dialyzed for 2 days using a dialysis membrane (tube size 30/32. Union Carbide Corp.), and the dialyzate was lyophilized to give 4.2 g of sulfoethylpullulan sodium salt.

When treated in the same manner, four pullulan species respectively having molecular weights of 30,000 ($\overline{Mw}/\overline{Mn}=1.28$), 60,000 ($\overline{Mw}/\overline{Mn}=1.24$), 280,000 ($\overline{Mw}/\overline{Mn}=1.19$) and 610,000 ($\overline{Mw}/\overline{Mn}=1.32$) gave the corresponding sulfoethylpullulan sodium salt species.

Reference Example 6

Pullulan (5.0 g) having a molecular weight of 60,000 ($\overline{Mw}/\overline{Mn}=1.24$) was dissolved in 50 ml of N,N-dimethylformamide. To the solution was added 7.8 g of pyridine. To this solution was added dropwise with stirring a solution of 1.1 g of maleic anhydride in 30 ml of N,N-dimethylformamide over about 30 minutes. After completion of the dropping, the mixture was stirred overnight at room temperature. The reaction mixture thus obtained was added dropwise to about 5 liters of methanol with stirring to thereby cause reprecipitation. The precipitate obtained was dissolved in 40 ml of water and the resultant solution was subjected to reprecipitation treatment using about 5 liters of methanol to give 4.3 g of pullulan maleate.

When treated in the same manner, a pullulan species having a molecular weight of 610,000 ($\overline{Mw}/\overline{Mn}=1.32$) gave the corresponding pullulan maleate species.

Reference Example 7

Pullulan (5.0 g) having a molecular weight of 60,000 ($\overline{Mw}/\overline{Mn}=1.24$) was dissolved in 50 ml of N,N-dimethylformamide with heating at about 60° C., and 7.8 g of pyridine was added to the solution obtained. To this solution was added dropwise with stirring a solution of 1.1 g of maleic anhydride in 30 ml of N,N-dimethylformamide over about 30 minutes. After completion of the dropping, the resultant mixture was stirred at room temperature for 4 hours. The reaction mixture obtained was added dropwise to about 5 liters of methanol with stirring to thereby cause reprecipitation. The precipitate obtained was dissolved in about 200 ml of water, and the solution was made alkaline by adding powdery sodium bicarbonate. This solution was filtered through an ultrafiltration membrane with a cutoff molecular weight of 20,000 over 1 day, the filtrate obtained was concentrated, and the filtrate was subjected to reprecipitation treatment using about 3 liters of isopropanol to give 4.9 g of pullulan maleate sodium salt.

When treated in the same manner, two pullulan species respectively having moleuclar weights of 30,000 ($\overline{Mw}/\overline{Mn}=1.28$) and 120,000 ($\overline{Mw}/\overline{Mn}=1.26$) gave the corresponding pullulan maleate sodium salt species.

Reference Example 8

The procedure of Reference Example 6 was followed using 1.1 g of succinic anhydride in lieu of 1.1 g of maleic anhydride to give 4.5 g of pullulan succinate. When treated in the same manner, pullulan having a molecular weight of 280,000 (Mw/Mn=1.19) gave the corresponding pullulan succinate.

Reference Examples 9-13

Pullulan (5.0 g) having a molecular weight of 60,000 ($\overline{Mw}/\overline{Mn}$=1.24) was dissolved in 45 ml of 0.8 mole/liter aqueous sodium bicarbonate solution. Then, while the solution was maintained at a pH of not less than 7 by portionwise addition of 13.0 g of powdery sodium bicarbonate, 15.0 g of cis-aconitic anhydride was added gradually to the solution over 10 hours. The resultant mixture was then allowed to stand overnight at room temperature. The reaction mixture obtained was subjected to reprecipitation treatment using about 5 liters of methanol, the precipitate obtained was dissolved in about 600 ml of water, and the solution was dialyzed for 2 days using a dialysis membrane (tube size 30/32, Union Carbide Corp.). The dialyzate was concentrated to about 60 ml and the concentrate was subjected to reprecipitation treatment using about 3 liters of isopropanol to give 5.0 g of pullulan cis-aconitate sodium salt.

The above reaction and purification procedures were followed using a prescribed amount of each of various acid anhydrides shown in Table 4 in lieu of cis-aconitic anhydride, to give the corresponding polybasic acid ester of pullulan in the sodium salt form.

The results thus obtained are shown in Table 4. In Reference Example 11, 200 ml of 0.8 mole/liter aqueous sodium bicarbonate solution was used.

TABLE 4

| Reference Example No. | Starting acid anhydride (charged, g) | Product activated pullulan (yield, g) |
|---|---|---|
| 9 | cis-Aconitic anhydride (15.0) | Pullulan cis-aconitate sodium salt (5.0) |
| 10 | Tetrahydrofuran-2,3,4,5-tetracarboxylic dianhydride (9.5) | Pullulan tetrahydrofuran-2,3,4,5-tetracarboxylate sodium salt (4.5) |
| 11 | cis,cis,cis,cis-1,2,3,4-Cyclopentanetetracarboxylic dianhydride (6.5) | Pullulan cis,cis,cis,cis-1,2,3,4-cyclopentanetetracarboxylate sodium salt (4.6) |
| 12 | 1,2,3-Propanetricarboxylic anhydride (15.0) | Pullulan 1,2,3-propanetricarboxylate sodium salt (4.6) |
| 13 | Succinic anhydride (10.0) | Pullulan succinate sodium salt (5.8) |

When treated in the same manner, pulluian species respectively having molecular weights of 120,000 ($\overline{Mw}/\overline{Mn}$=1.26) and 280,000 ($\overline{Mw}/\overline{Mn}$=1.19) gave the corresponding polybasic acid esters of pulluian in the sodium salt form.

Reference Example 14

Pullulan (7.0 g) having a molecular weight of 120,000 ($\overline{Mw}/\overline{Mn}$=1.26) was dissolved in 35 ml of 30% aqueous sodium hydroxide solution with heating. While maintaining the aqueous solution obtained at a temperature of 70°-80° C., 4.3 g of monochloroacetic acid was added to said solution in several divided portions and the mixture was stirred for 4 hours. The reaction mixture obtained was subjected to reprecipitation treatment using about 5 liters of methanol. The precipitate obtained was dissolved in about 600 ml of water, and dialysis was carried out for 2 days using a dialysis membrane (tube size 30/32, Union Carbide Corp.). The dialyzate was lyophilized to give 6.9 g of carboxymethylpullulan sodium salt.

When treated in the same manner, pullulan species respectively having molecular weights of 30,000 ($\overline{Mw}/\overline{Mn}$=1.28), 60,000 ($\overline{Mw}/\overline{Mn}$=1.24), 280,000 ($\overline{Mw}/\overline{Mn}$=1.19) and 610,000 ($\overline{Mw}/\overline{Mn}$=1.32) gave the corresponding carboxymethylpullulan sodium salt species.

Reference Example 15

Pullulan (3.0 g) having a molecular weight of 60,000 ($\overline{Mw}/\overline{Mn}$=1.26) was dissolved with heating in a solution of 6 g of sodium hydroxide in 12 ml of water. While the solution obtained was maintained at a temperature of 100°-110° C., 5.0 g of β-chloropropionic acid was added in several portions to said solution and the mixture was stirred for 5 hours. The reaction mixture obtained was subjected to reprecipitation treatment using about 4 liters of methanol. The precipitate obtained was dissolved in about 10 ml of water, and the solution was subjected to reprecipitation treatment using about 2 liters of methanol. Two repetitions of this reprecipitation procedure gave 3.0 g of carboxyethylpullulan sodium salt.

Reference Example 16

The procedure of Reference Example 14 was followed using 14.7 g of 5-chlorovaleric acid in lieu of 4.3 g of monochloroacetic acid to give 6.5 g carboxybutylpullulan sodium salt.

Reference Example 17

Platinum (II) potassium chloride (15.00 g) was dissolved in 160 ml of water. To the solution was added a solution of 4.20 g of trans-1,2-diaminocyclohexane (hereinafter abbreviated as "DACH"; Aldrich Chemical Co.) in 20 ml of water, and the mixture was stirred at room temperature for 1 day. The resultant crystalline precipitate was filtered off and recrystallized from about 25 liters of 0.1 N hydrochloric acid to give 8.80 g of cis-dichloro(DACH)platinum(II) as yellow needles.

A solution of 340 mg (2.00 millimoles) of silver nitrate in 3 ml of water was added to a mixture of 388 mg (1.02 millimoles) of cis-dichloro(DACH)platinum(II) obtained in the above manner and 6 ml of water, and the mixture was stirred, in a system protected from light, at about 60° C. for 40 minutes and then at room temperature overnight. Thereafter, the resultant silver chloride precipitate was removed from the reaction mixture by filtration. Thus was obtained an aqueous solution of cis-dinitrato(DACH)platinum(II) as the filtrate.

Reference Example 18

Platinum (II) potassium chloride (6.23 g) was dissolved in 65 ml of water. To the solution was added a solution of 1.80 g of 2-aminomethylpyridine in 10 ml of water. The mixture was stirred at room temperature for 1 day. The resultant crystalline precipitate was collected by filtration, washed with water and then dried to give 4.39 g of cis-dichloro(2-aminomethylpyridine)platinum(II) as yellow crystals.

A solution of 340 mg (2.00 millimoles) of silver nitrate in 4 ml of water was added to a maixture of 382 mg (1.02 millimoles) of cis-dichloro(2-aminomethylpyridine)platinum(II) obtained in the above manner and 20 ml of water. The resultant mixture was stirred, in a system protected from light, at about 60° C. for 40 minutes and then at room temperature overnight. Thereafter, the resultant silver chloride precipitate was removed from the reaction mixture by filtration. Thus was obtained an aqueous solution of cis-dinitrato-(2-aminomethylpyridine)platinum (II) as the filtrate.

Reference Example 19

Platinum (II) potassium chloride (10.00 g) was dissolved in 60 ml of water. To the solution was added a solution of 4.20 g of cyclopentylamine in 40 ml of water. The resultant mixture was stirred at room temperature for 6 hours. The resultant crystalline precipitate was collected by filtration and washed in sequence with concentrated hydrochloric acid, water, methanol, acetone and diethyl ether. The thus-obtained crystals were then dissolved in 50 ml of N,N-dimethylformamide. To the solution was added 100 ml of 0.5 N hydrochloric acid, and the resultant crystalline precipitate was collected by filtration and washed with water and methanol in that order to give 2.02 g of cis-dichlorobis(cyclopentylamine)platinum(II) as light-yellow crystals.

A solution of 340 mg (2.00 millimoles) of silver nitrate in 3 ml of water was added to a mixture of 455 mg (1.02 millimoles) of cis-dichlorobis(cyclopentylamine)-platinum(II) obtained in the above manner and 8 ml of water, and the resultant mixture was stirred, in a system protected from light, at about 60° C. for 1 hour and then at room temperature overnight. Then, the resultant silver chloride precipitate was removed from the reaction mixture by filtration to give an aqueous solution of cis-dinitratobis(cyclopentylamine)platinum(II) as the filtrate.

Reference Example 20

The procedure of Reference Example 17 was followed to react 259 mg (0.68 millimole) of cis-dichloro(-DACH)platinum(II) with 227 mg (1.34 millimoles) of silver nitrate to give an aqueous solution of cis-dinitrato(DACH)platinum(II). This solution was passed through a column packed with 30 ml of the anion exchange resin Diaion SA-10A (OH form). Thus was obtained 20 ml of an aqueous solution of cis-dihydroxo(-DACH)platinum(II) as an alkaline aqueous solution.

Reference Example 21

The procedure of Reference Example 17 was followed to react 204 mg (0.68 millimole) of cis-dichlorodiammineplatinum(II) with 227 mg (1.34 millimoles) of silver nitrate to give an aqueous solution of cis-dinitratodiammineplatinum(II). This solution was passed through a column packed with 30 ml of the anion exchange resin Diaion SA-10A (OH form) to give 20 ml of an aqueous solution of cis-dihydroxodiammineplatinum(II) as an alkaline aqueous solution.

Reference Example 22

A solution of 312 mg (1.00 millimole) of silver sulfate in 40 ml of water was added to a mixture of 388 mg (1.02 millimoles) of cis-dichloro(DACH)platinum(II) obtained in the same manner as in Reference Example 17 and 2 ml of water, and the resultant mixture was stirred, in a system protected from light, at about 60° C. for 40 minutes and then at room temperature overnight. Thereafter, the resultant silver chloride precipitate was removed from the reaction mixture by filtration to give an aqueous solution of cis-sulfato(DACH)platinum(II) as the filtrate.

Reference Example 23-26

A mixture of a prescribed amount (1.02 millimoles) of each of the cis-dichloroplatinum complexes shown in Table 5 as obtained by a known method and a prescribed amount of water was prepared. To the mixture was added a solution of 340 mg (2.00 millimoles) of silver nitrate in 3 ml of water, and th same reaction and purification procedures as in Reference Example 17 were carried out to give an aqueous solution of the corresponding dinitratoplatinum complex. The results thus obtained are shown in Table 5.

TABLE 5

| Reference Example No. | Starting dichloroplatinum complex (mg/ml water) | Product dinitratoplatinum complex, in the form of aqueous solution |
|---|---|---|
| 23 | cis-Dichlorodiammine-platinum(II) (306/6) | cis-Dinitratodiammine-platinum(II) |
| 24 | cis-Dichloro(R-2-aminomethylpyrrolidine)-platinum(II) (373/20) | cis-Dinitrato(R-2-aminomethylpyrrolidine)-platinum(II) |
| 25 | cis-Dichloro(2-methyl-1,4-butanediamine)-platinum(II) (376/6) | cis-Dinitrato(2-methyl-1,4-butanediamine)platinum(II) |
| 26 | cis-Dichloro(l-DACH)-platinum(II) (388/6) | cis-Dinitrato(l-DACH)-platinum(II) |

Example 1

800 mg of the pullulan sulfate sodium salt [molecular weight of pullulan: 120,000 ($\overline{M}w/\overline{M}n=1.26$)] obtained in Reference Example 1 was dissolved in 40 ml of water. To the solution was added the aqueous solution of cis-dinitrato(DACH)platinum(II) as obtained in Reference Example 17, and the mixture was stirred overnight at room temperature in a system protected from light. The reaction mixture was dialyzed for 2 days using a dialysis membrane (tube size 30/32; Union Carbide Corp.). The dialyzate was deprived of a small amount of insoluble matter on a centrifuge and then lyophilized to give 820 mg of cis-nitrato(DACH)platinum(II)/cis-aqua(-DACH)platinum(II) nitrate-pullulan sulfate complex [cis-nitrato(DACH)platinum(II) and cis-aqua(DACH)-platinum(II) nitrate partly bound to pullulan sulfate, as represented by general formula (I'-1), in which, in this case, $L^1$ and $L^2$ combinedly represent 1,2-diaminocyclohexane, $X^3$ is nitrato and A is —$SO_3$—, and general formula (I'-2), in which $L^1$ and $L^2$ combinedly represent 1,2-diaminocyclohexane, $X^3$ is nitrato and A is —$SO_3$—, respectively; hereinafter the same shall apply]. The platinum content of this macromolecular complex was 9.6% by weight and the sulfur content was 3.4% by weight. An infrared absorption spectrum (FT-IR) of the complex obtained is shown in FIG. 1.

Example 2

Figure 2:
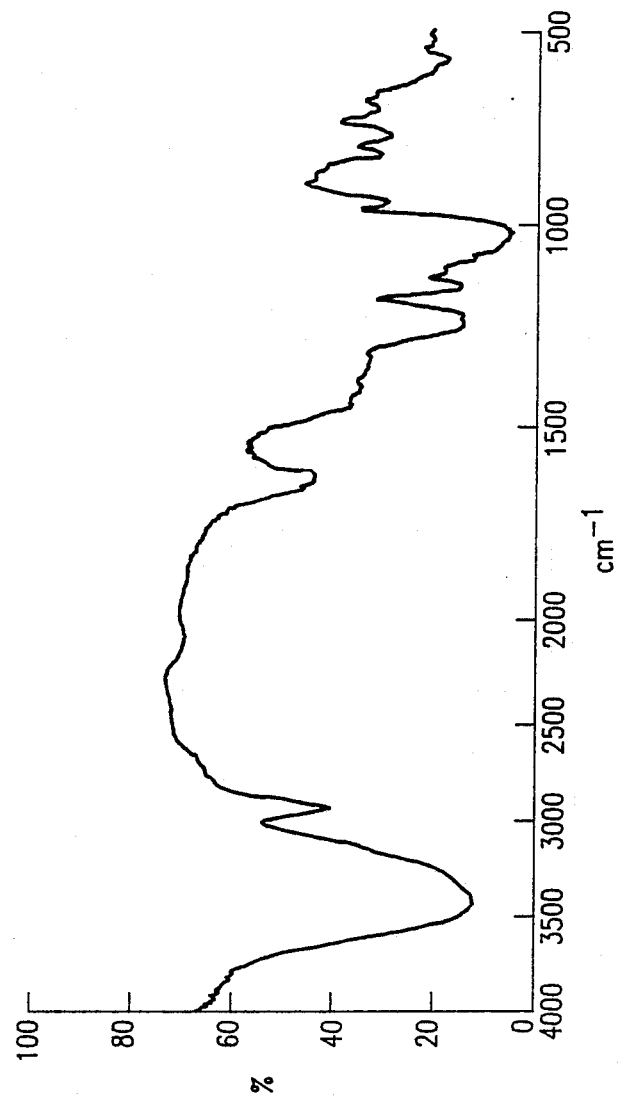

The aqueous solution of cis-dinitrato(2-aminomethylpyridine)platinum(II) as obtained in Reference Example 18 was adjusted to pH 4.5 with diluted aqueous ammonia and added to a solution prepared by dissolving 900 mg of the pullulan sulfate [molecular weight of pullulan: 120,000 ($\overline{M}w/\overline{M}n=1.26$)] obtained in Reference Example 2 in 20 ml of water, and the mixture was stirred overnight at room temperature in a system protected from light. The reaction mixture was treated in the same manner as in Example 1 to give 860 mg of cis-nitrato(2-aminomethylpyridine)platinum(II)/cis-aqua(2-aminomethylpyridine)platinum(II) nitrate-pullulan sulfate complex. The platinum content of this macromolecular complex was 7.4% by weight and the sulfur content 4.4% by weight. An infrared absorption spectrum (FT-IR) of the complex obtained is shown in FIG. 2.

Example 3

Figure 3:
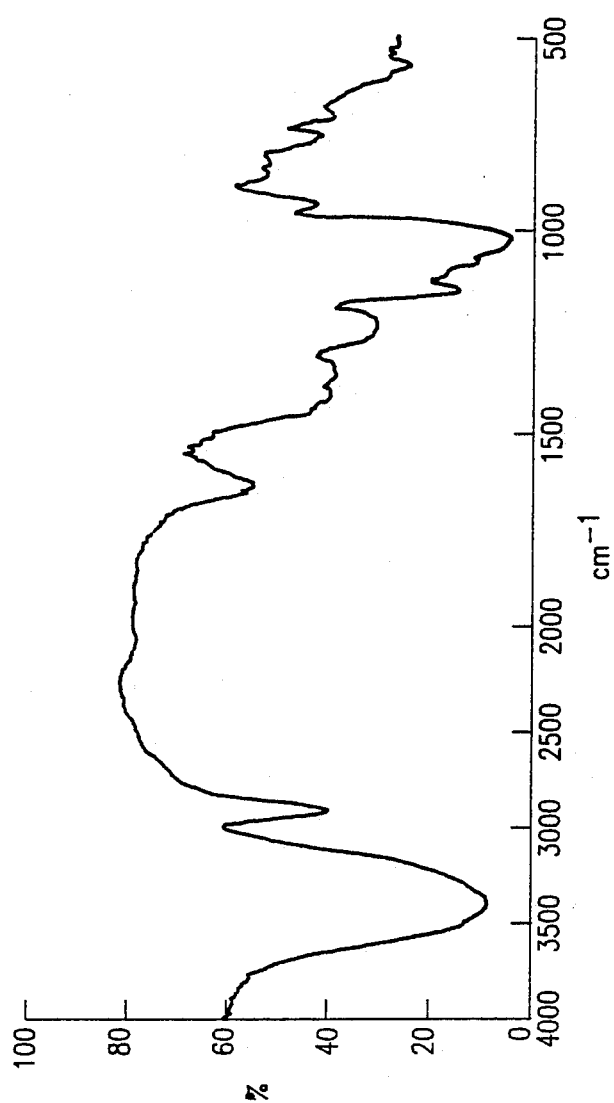

800 mg of the pullulan sulfate sodium salt [molecular weight of pullulan: 60,000 ($\overline{M}w/\overline{M}n=1.24$)] obtained in Reference Example 1 was dissolved in 12 ml of water. To the solution obtained, there was added the aqueous solution of cis-dinitratobis(cyclopentylamine)platinum-(II) as obtained in Reference Example 19, and the mixture was stirred overnight at room temperature. The reaction mixture was treated in the same manner as in Example 1 to give 770 mg of cis-nitratobis(cyclopentylamine)platinum(II)/cis-aquabis(cyclopentylamine)platinum(II) nitrate-pullulan sulfate complex. The platinum content of this macromolecular complex was 2.7% by weight. An infrared absorption spectrum (FT-IF) of the complex obtained is shown in FIG. 3.

Example 4

Figure 4:
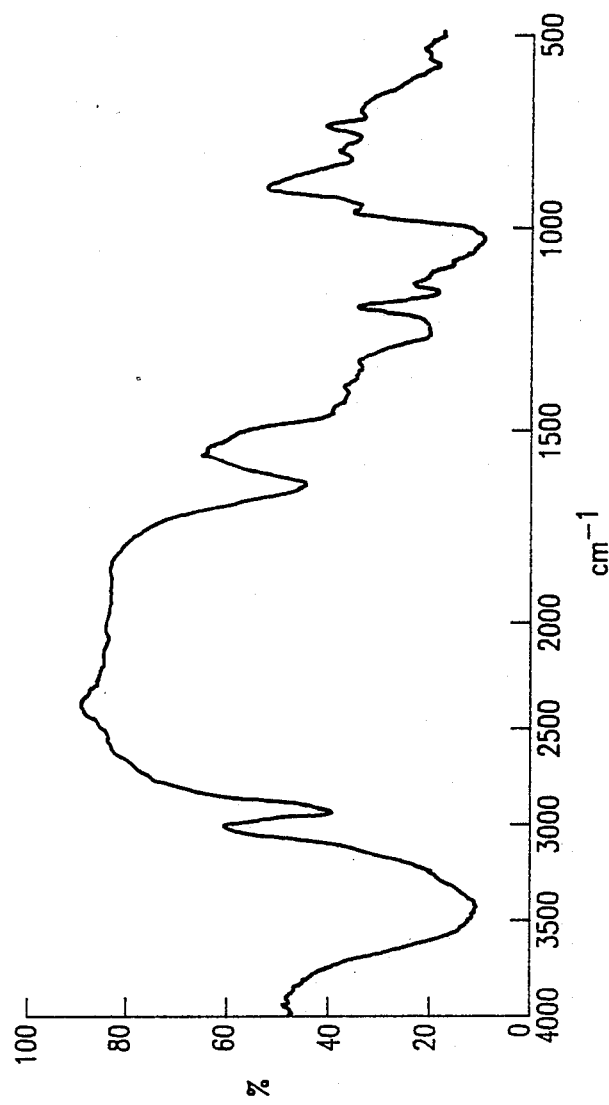

800 mg of the pullulan sulfate sodium salt [molecular weight of pullulan: 60,000 ($\overline{M}w/\overline{M}n=1.24$)] was dissolved in 20 ml of water. To the solution obtained, there was added 20 ml of the aqueous solution of cis-dihydroxo(DACH)platinum(II) as obtained in Reference Example 20, and the mixture was stirred overnight at room temperature. The reaction mixture was treated in the same manner as in Example 1 to give 805 mg of cis-hydroxo(DACH)platinum(II)/cis-aqua(DACH)platinum(II) hydroxide-pullulan sulfate complex. The platinum content of this macromolecular complex was 3.5% by weight and the sulfur content was 4.1% by weight. An infrared absorption spectrum (FT-IR) of the complex obtained is shown in FIG. 4.

Example 5

Figure 5:
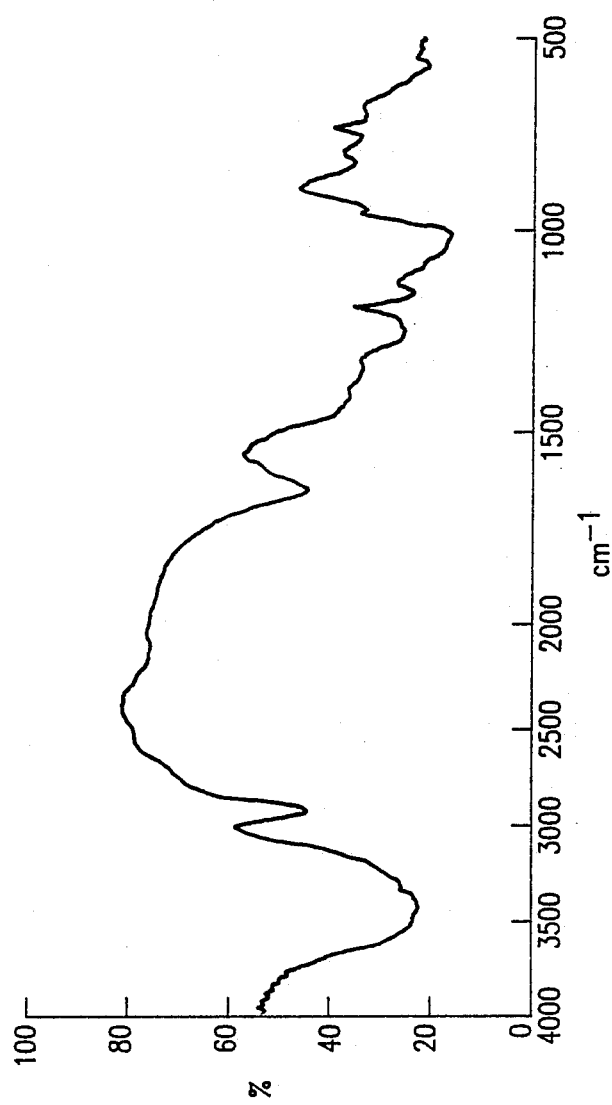
Figure 6:
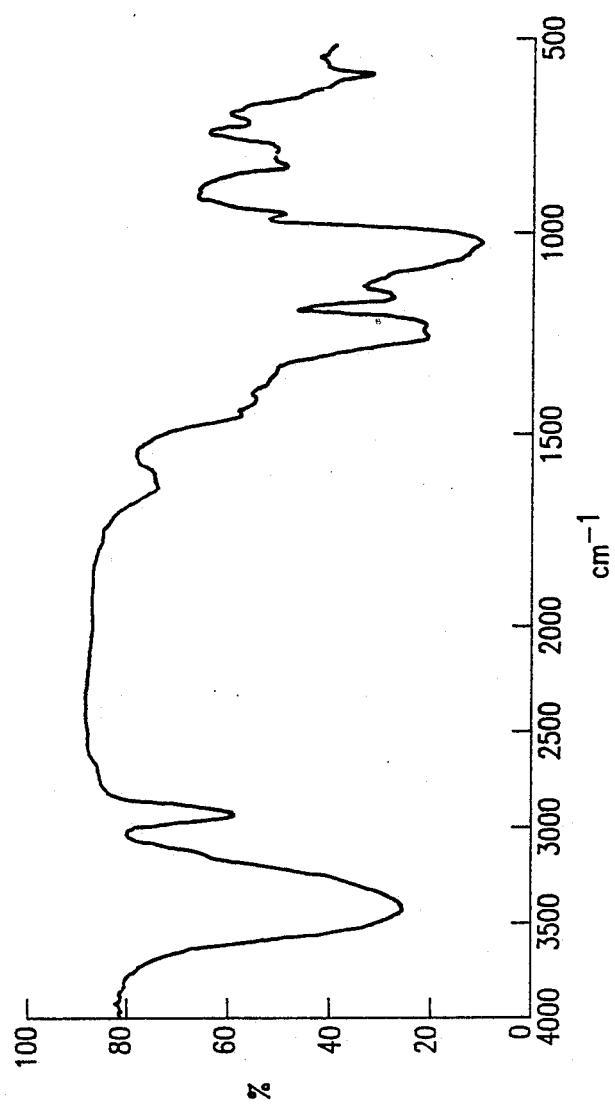
Figure 7:
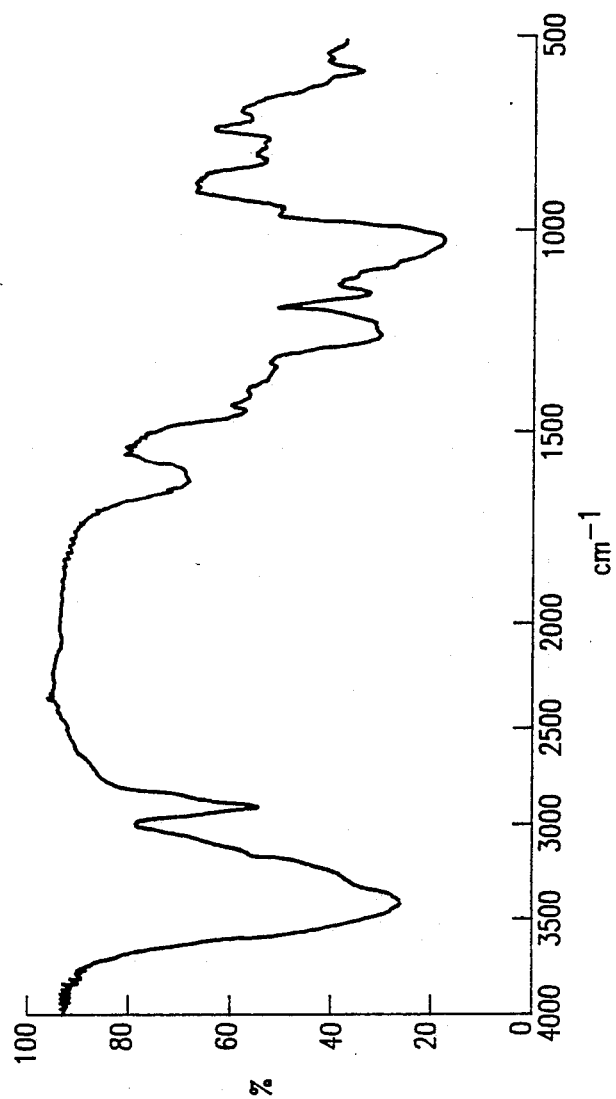
Figure 8:
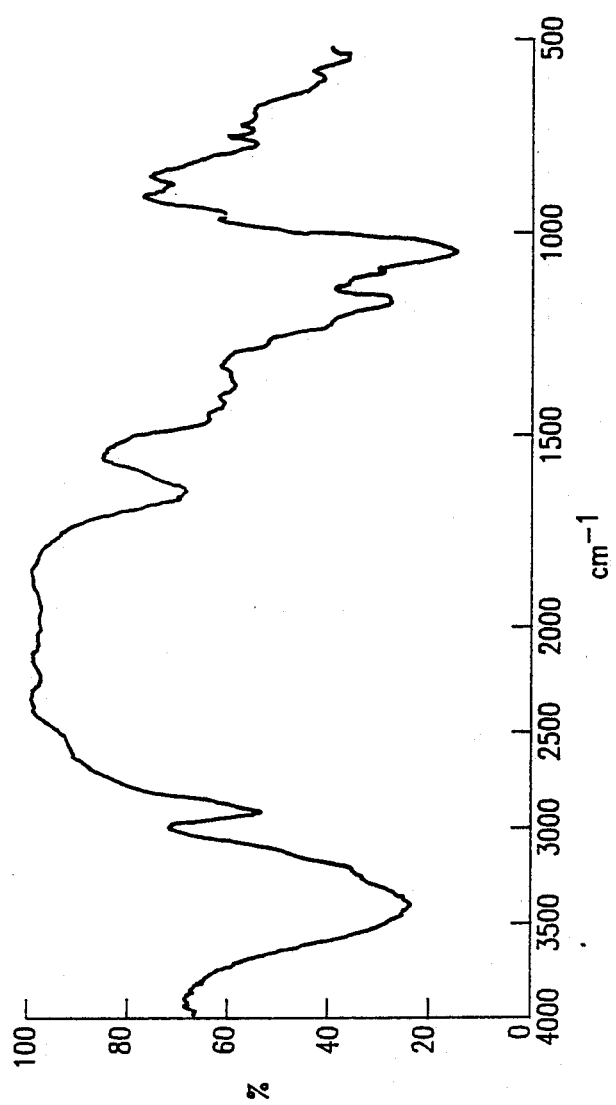
Figure 9:
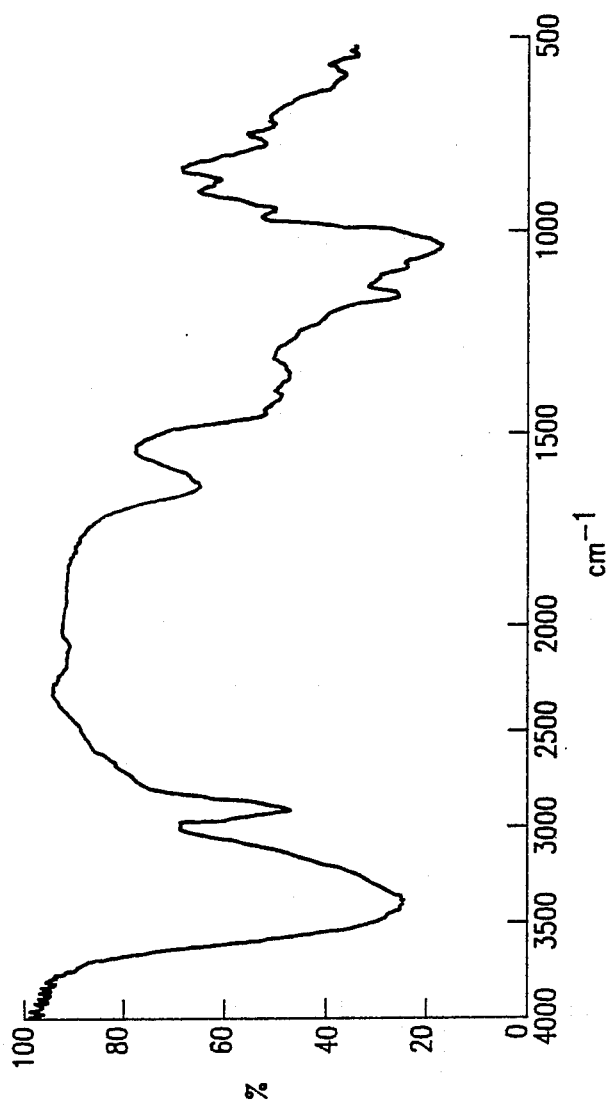
Figure 10:
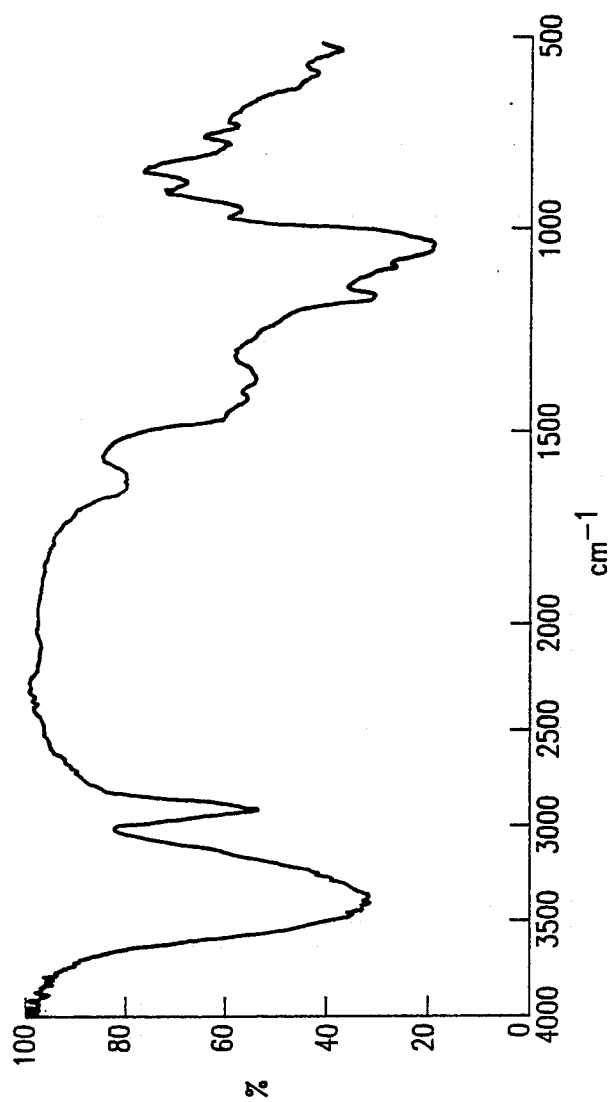
Figure 11:
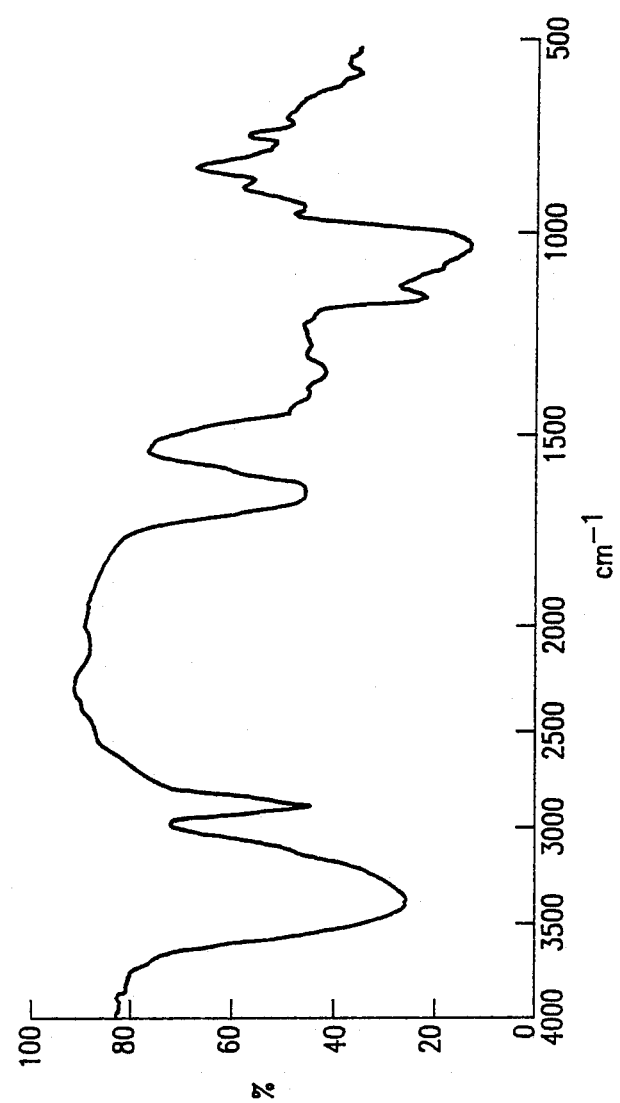
Figure 12:
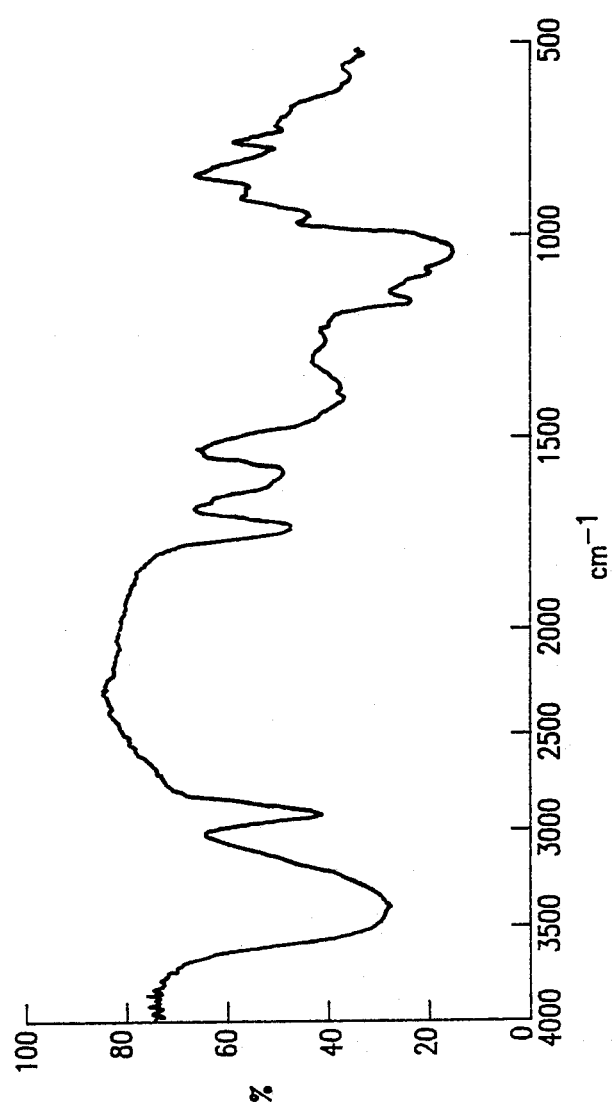
Figure 13:
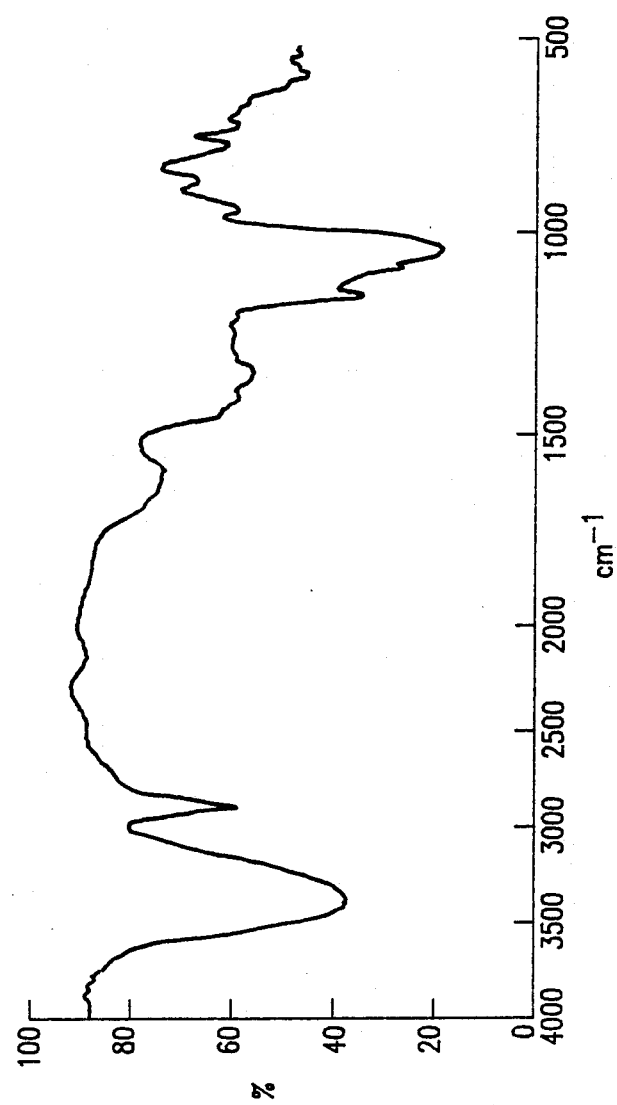
Figure 14:
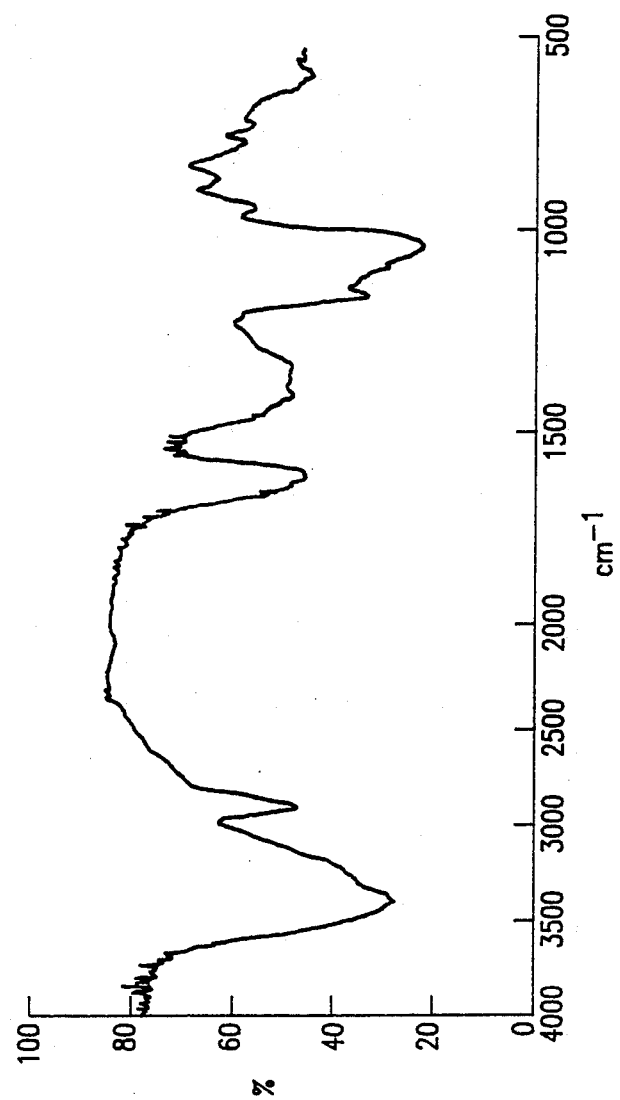
Figure 15:
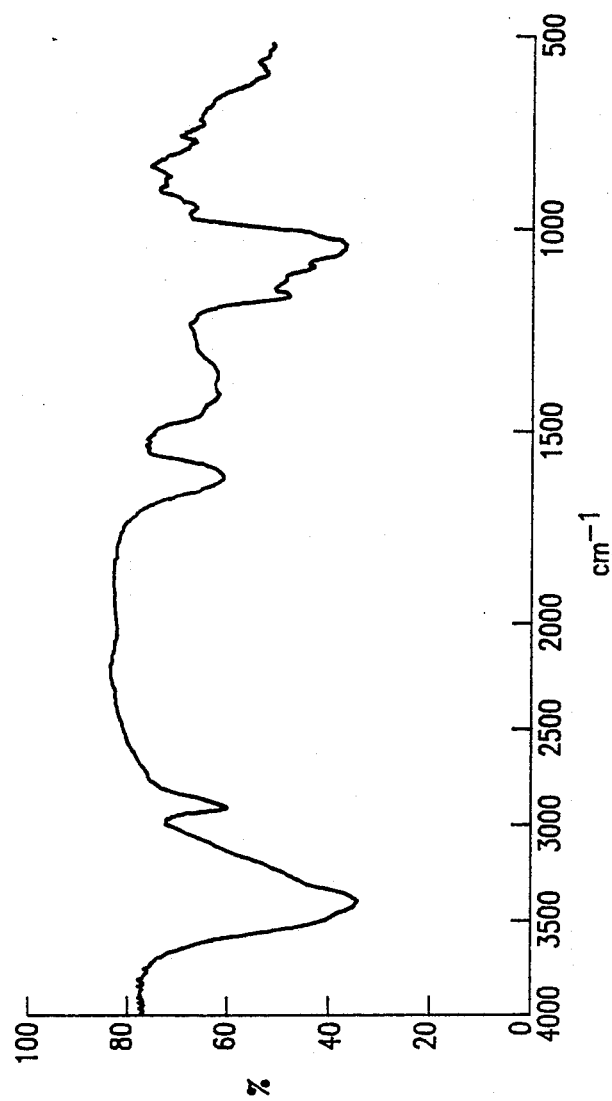
Figure 16:
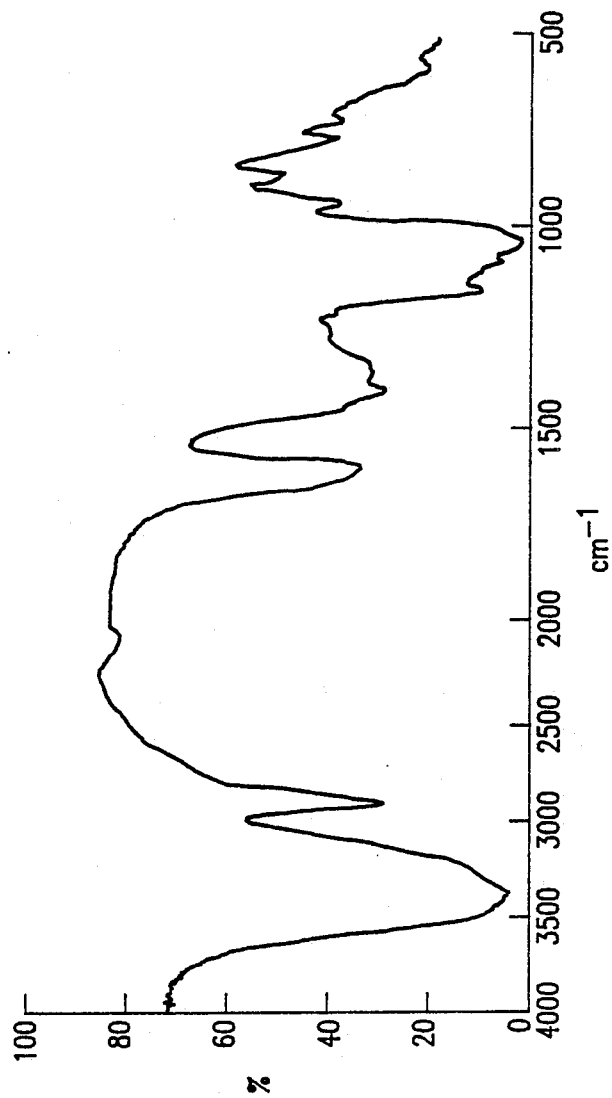
Figure 17:
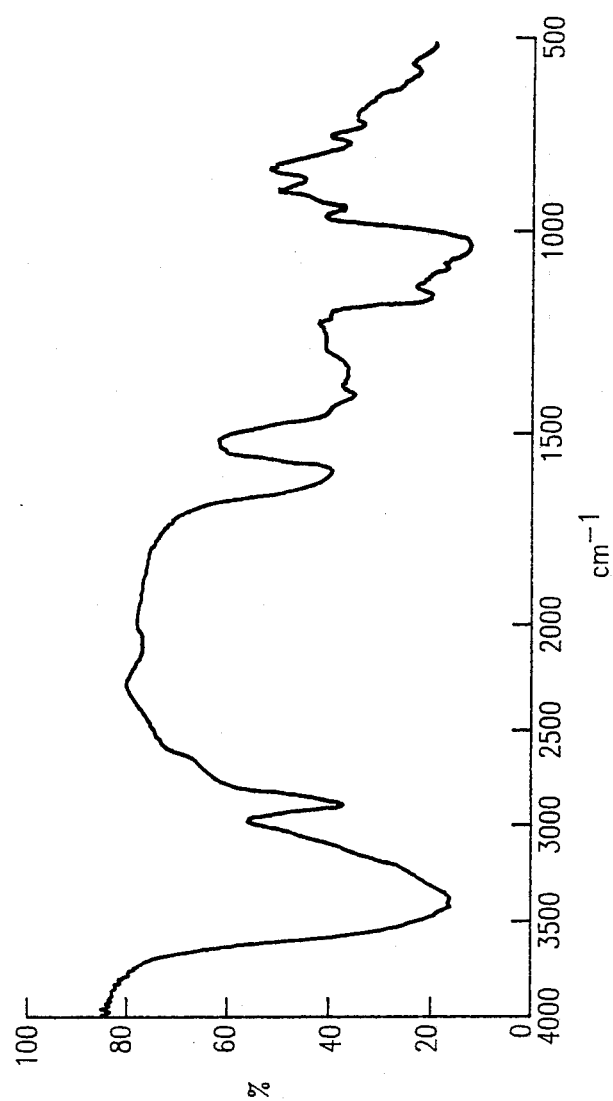

The procedure of Example 4 was followed using the aqueous solution of cis-dihydroxodiammineplatinum(II) obtained in Reference Example 21 in lieu of the aqueous solution of cis-dihydroxo(DACH)platinum(II) to give 810 mg of cis-hydroxodiammineplatinum(II)/cis-aquadiammineplatinum(II) hydroxide-pullulan sulfate complex. The platinum content of this macromolecular complex was 4.1% by weight and the sulfur content was 4.0% by weight. An infrared absorption spectrum (FT-IR) of the complex obtained is shown in FIG. 5.

Example 6

The procedure of Example 1 was followed using 800 mg of the pullulan sulfate [molecular weight of pullulan: 60,000 ($\overline{M}w/\overline{M}n=1.24$)] obtained in Reference Example 1 in lieu of 800 mg of the pullulan sulfate [molecular weight of pullulan: 120,000 ($\overline{M}w/\overline{M}n=1.26$)] obtained in Reference Example 1 to give 820 mg of cis-nitrato(DACH)platinum(II)/cis-aqua(DACH)platinum(II) nitrate-pullulan sulfate complex. The platinum content of this macromolecular complex was 4.3% by weight.

Examples 7-17

1,000 mg of each of the activated pullulans shown in Table 6 as obtained in the same manner as described in the reference examples was dissolved in a prescribed amount of water to give an aqueous solution of the activated pullulan. To the aqueous solution obtained, there was added an aqueous solution of the counterpart platinum complex as obtained in the same manner as in the reference examples, and the mixture was stirred overnight at room temperature in a system protected from light. The reaction mixture was dialyzed for 2 days using a dialysis membrane (tube size 30/32, Union Carbide Corp.). When insoluble matter was present in the dialyzate, said insoluble matter was removed on a centrifuge. The dialyzate was then lyophilized to give the desired macromolecular complex. The yield and platinum content, in some instances together with the sulfur content, of each macromolecular complex obtained are shown in Table 6. Infrared absorption spectra (FT-IR) of the macromolecular complexes obtained in Examples 7, 9, 13, 14 and 15 are shown in FIGS. 6-10, respectively.

TABLE 6

| Example No. | Activated pullulan (quantity of water, ml) (Reference Example; mol. wt. of pullulan) | Starting platinum complex (Reference Example) | Product macromolecular complex Yield (mg) Pt and/or S content (weight %) |
| --- | --- | --- | --- |
| 7 | Pullulan sulfate sodium salt (40) (Ref. Example 1; 5,000) | cis-Dinitrato(DACH)-platinum(II) (Ref. Example 17) | cis-Nitrato(DACH)platinum(II)/cis-aqua-(DACH)platinum(II) nitrate-pullulan sulfate complex 970 Pt 3.5 S 6.2 |
| 8 | Pullulan sulfate sodium salt (40) (Ref. Example 1; 30,000) | cis-Dinitrato(DACH)-platinum(II) (Ref. Example 17) | cis-Nitrato(DACH)platinum(II)/cis-aqua-(DACH)platinum(II) nitrate-pullulan sulfate complex 1030 Pt 4.3 |
| 9 | Pullulan sulfate sodium salt (40) (Ref. Example 1; 610,000) | cis-Dinitrato(DACH)-platinum(II) (Ref. Example 17) | cis-Nitrato(DACH)platinum(II)/cis-aqua-(DACH)platinum(II) nitrate-pullulan sulfate complex 1170 Pt 5.1 S 4.3 |
| 10 | Pullulan sulfate sodium salt (40) (Ref. Example 1; 120,000) | cis-Dinitratodiammine-platinum(II) (Ref. Example 23) | cis-Nitratodiammineplatinum(II)/cis-aquadiammineplatinum(II) nitrate-pullulan sulfate complex 990 Pt 9.8 |
| 11 | Pullulan sulfate sodium salt (40) (Ref. Example 1; 60,000) | cis-Dinitrato(R-2-aminomethylpyrrolidine)-platinum(II) (Ref. Example 24) | cis-Nitrato(DACH)(R-2-aminomethylpyrrolidine)platinum(II)/cis-aqua(R-2-aminomethylpyrrolidine)platinum(II) nitrate-pullulan sulfate complex 1030 |

TABLE 6-continued

| Example No. | Activated pullulan (quantity of water, ml) (Reference Example; mol. wt. of pullulan) | Starting platinum complex (Reference Example) | Product macromolecular complex Yield (mg) Pt and/or S content (weight %) |
|---|---|---|---|
| 12 | Sulfoethylpullulan sodium salt (40) (Ref. Example 5; 30,000) | cis-Dinitrato(DACH)-platinum(II) (Ref. Example 17) | cis-Nitrato(DACH)platinum(II)/cis-aqua-(DACH)platinum(II) nitrate-sulfoethyl-pullulan complex 1080 Pt 3.1 |
| 13 | Sulfoethylpullulan sodium salt (40) (Ref. Example 5; 60,000) | cis-Dinitrato(DACH)-platinum(II) (Ref. Example 17) | cis-Nitrato(DACH)platinum(II)/cis-aqua-(DACH)platinum(II) nitrate-sulfoethyl-pullulan complex 1100 Pt 3.3 |
| 14 | Sulfoethylpullulan sodium salt (40) (Ref. Example 5; 120,000) | cis-Dinitrato(DACH)-platinum(II) (Ref. Example 17) | cis-Nitrato(DACH)platinum(II)/cis-aqua-(DACH)platinum(II) nitrate-sulfoethyl-pullulan complex 1080 Pt 9.9 S 3.5 |
| 15 | Sulfoethylpullulan sodium salt (40) (Ref. Example 5; 610,000) | cis-Dinitrato(DACH)-platinum(II) (Ref. Example 17) | cis-Nitrato(l-DACH)platinum(II)/cis-aqua(l-DACH)platinum(II) nitrate-sulfoethylpullulan complex 1040 Pt 6.4 |
| 16 | Sulfoethylpullulan sodium salt (40) (Ref. Example 5; 280,000) | cis-Dinitrato(l-DACH)-platinum(II) (Ref. Example 26) | cis-Nitrato(l-DACH)platinum(II)/cis-aqua(l-DACH)platinum(II) nitrate-sulfoethylpullulan complex 1090 Pt 4.5 |
| 17 | Sulfoethylpullulan sodium salt (40) (Ref. Example 5; 280,000) | cis-Dinitrato(2-methyl-1,4-butanediamine)-platinum(II) (Ref. Example 25) | cis-Nitrato(2-methyl-1,4-butanediamine)-platinum(II)/cis-aqua(2-methyl-1,4-butanediamine)platinum(II) nitrate-sulfoethylpullulan complex 1070 Pt 4.2 Pt 4.8 |

Examples of 18–26

1,000 mg of each of the activated pulluian shown in Table 7 was dissolved in a prescribed amount of water to give as an aqueous solution of the activated pulluian. To the aqueous solution was added an aqueous solution of cis-dinitrato(DACH)platinum(II) as obtained in the same manner as in Reference Example 17, and the mixture protected from light. The reaction mixture was dialyzed for 2 days using a dialysis membrane (tube size 30/32, Union Carbide Corp.). When insoluble matter was removed on a centrifuge. The dialyzate was then lyophilized to give the desired macromolecular complex. In Example 21, the product cis-(DACH)platinum-(II)-pullulan cis-aconitate complex means a complex in which the cis-(DACH)platinum(II) having two available bonds is bound to two residues derived from two

groups bound to two neighboring atoms of the pulluian cis-aconitate by removal of the respective hydrogen atoms (hereinafter the same shall apply). The yield and platinum content of each macromolecular complex thus obtained are shown in Table 7. Infrared absorption spectra (FT-IR) of the macromolecular complexes obtained in Examples 19, 20, 21, 22, 24, 25 and 26 are shown in FIGS. 11–17, respectively.

TABLE 7

| Example No. | Activated pullulan (quantity of water, ml) (Reference Example; mol. weight of pullulan) | Product macromolecular complex Yield (mg) Pt content (weight %) |
|---|---|---|
| 18 | Pullulan maleate sodium salt (40) (Ref. Example 7; 30,000) | cis-Nitrato(DACH)platinum-(II)/cis-aqua(DACH)platinum(II) nitrate-pullulan maleate complex 1110 Pt 4.9 |
| 19 | Pullulan maleate sodium salt (40) (Ref. Example 7; 60,000) | cis-Nitrato(DACH)platinum-(II)/cis-aqua(DACH)platinum(II) nitrate-pullulan maleate complex 1100 Pt 7.3 |
| 20 | Pullulan succinate (40) (Ref. Example 8; 60,000) | cis-Nitrato(DACH)platinum-(II)/cis-aqua(DACH)platinum(II) nitrate-pullulan succinate complex 1010 Pt 3.4 |
| 21 | Pullulan cis-aconitate sodium salt (40) (Ref. Example 9; 60,000) | cis-Nitrato(DACH)platinum-(II)/cis-aqua(DACH)platinum(II) nitrate/cis-(DACH)-platinum(II)-pullulan cis-aconitate complex 1000 Pt 5.0 |
| 22 | Carboxymethylpullulan sodium salt (40) (Ref. Example 14; 30,000) | cis-Nitrato(DACH)platinum-(II)/cis-aqua(DACH)platinum(II)-carboxymethylpullulan complex 1140 Pt 6.6 |
| 23 | Carboxymethylpullulan sodium salt (50) (Ref. Example 14; 60,000) | cis-Nitrato(DACH)platinum-(II)/cis-aqua(DACH)platinum(II)-carboxymethylpullulan complex 1070 |

TABLE 7-continued

| Example No. | Activated pullulan (quantity of water, ml) (Reference Example; mol. weight of pullulan) | Product macromolecular complex Yield (mg) Pt content (weight %) |
|---|---|---|
| 24 | Carboxymethylpullulan sodium salt (50) (Ref. Example 14; 120,000) | Pt 4.8 cis-Nitrato(DACH)platinum-(II)/cis-aqua(DACH)platinum(II)-carboxymethylpullulan complex 1140 |
| 25 | Carboxymethylpullulan sodium salt (50) (Ref. Example 14; 280,000) | Pt 4.9 cis-Nitrato(DACH)platinum-(II)/cis-aqua(DACH)platinum(II)-carboxymethylpullulan complex 1130 |
| 26 | Carboxymethylpullulan sodium salt (60) (Ref. Example 14; 610,000) | Pt 5.5 cis-Nitrato(DACH)platinum-(II)/cis-aqua(DACH)platinum(II)-carboxymethylpullulan complex 1080 Pt 6.6 |

EXAMPLES 27–29

1,000 mg of each of the activated pullulans shown in Table 8 as obtained in the same manner as in the reference examples indicated was dissolved in 10 ml of water. To the aqueous solution was added an aqueous solution of the counterpart solution was added an aqueous solution of the counterpart platinum complex shown in Table 8 as obtained in the same manner as in the reference example indicated, and the mixture was stirred overnight at room temperature in a system protected from light. When insoluble matter was found in the reaction mixture, said insoluble matter was removed on a centrifuge. The reaction mixture was then lyophilized. The lyophilized powder obtained was dissolved in 2 ml of water, and the solution obtained was added dropwise to about 500 ml of methanol with stirring to thereby cause reprecipitation. Three further repetitions of this reprecipitation procedure using about 500 ml of methanol gave the desired macromolecular complex. In Example 27, the cis-(DACH)platinum(II)-pullulan phosphate complex means a complex in which the cis-(DACH)platinum(II) having two available bonds is bound to the residue derived from the

Figure 18:
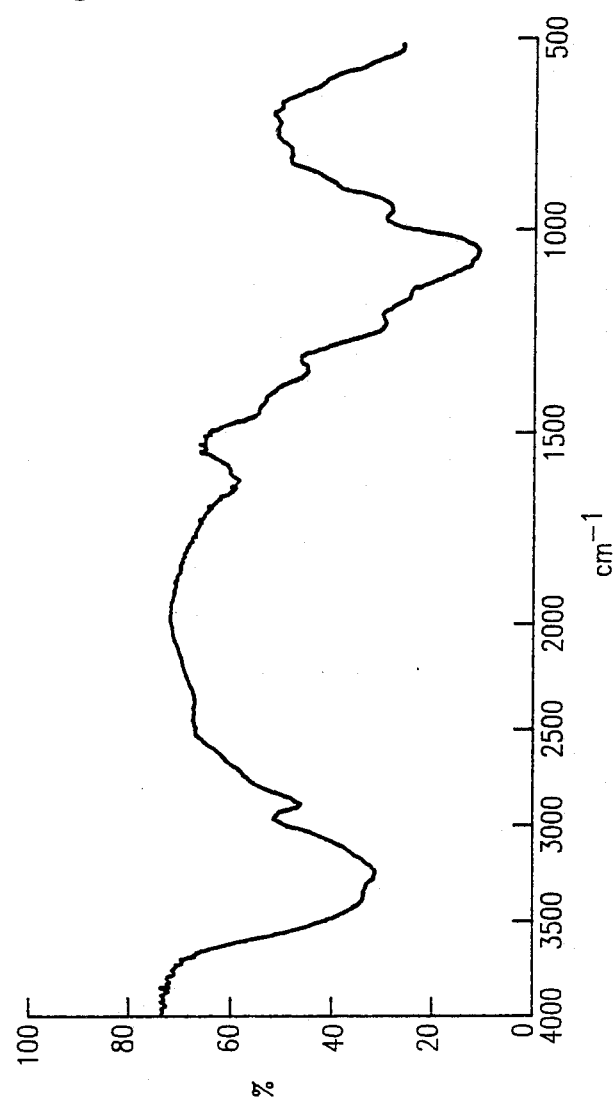
Figure 19:
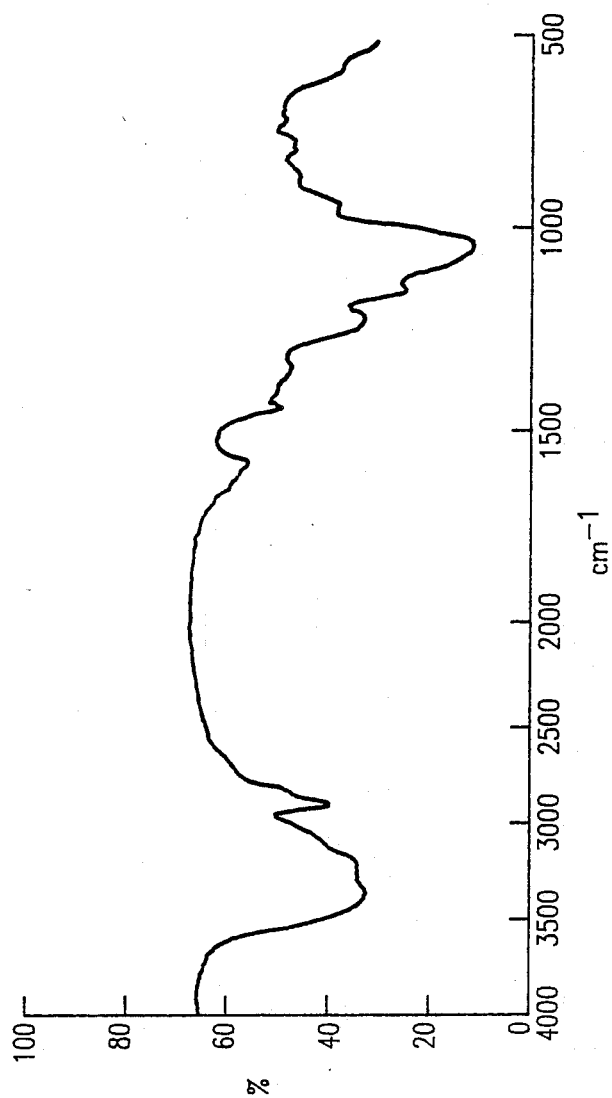

group of pullulan phosphate by removal of the two hydrogen atoms (hereinafter the same shall apply). The yield and platinum content, in some instances together with the phosphorus content, of each macromolecular complex obtained are shown in Table 8. Infrared absorption spectra (FT-IR) of the macromolecular complexes obtained in Examples 28 and 29 are shown in FIGS. 18 and 19, respectively.

TABLE 8

| Example No. | Activated pullulan (Ref. Example; mol. weight of pullulan) | Starting platinum complex (Reference Example) | Product macromolecular complex Yield (mg) Pt and/or P content (weight %) |
|---|---|---|---|
| 27 | Pullulan phosphate sodium salt (Ref. Example 3; 60,000) | cis-Dinitrato(DACH)-platinum(II) (Ref. Example 17) | cis-Nitrato(DACH)platinum(II)/ cis-aqua(DACH)platinum(II) nitrate/cis-(DACH)platinum(II)-pullulan phosphate complex 780 Pt 3.7 |
| 28 | Pullulan phosphate sodium salt (Ref. Example 3; 60,000) | cis-Dinitratodiammineplatinum(II) (Ref. Example 23) | cis-Nitratodiammineplatinum(II)/cis-aquadiammineplatinum(II) nitrate/cis-diammineplatinum(II)-pullulanphosphate complex 730 Pt 6.2 P 6.6 |
| 29 | Pullulan phosphate sodium salt (Ref. Example 4; 60,000) | cis-Dinitrato(DACH)-platinum(II) (Ref. Example 17) | cis-Nitrato(DACH)platinum(II)/ cis-aqua(DACH)platinum(II) nitrate/cis-(DACH)platinum(II)-pullulan phosphate complex 810 Pt 10.4 P 3.4 |

Examples 30–32

Figure 20:
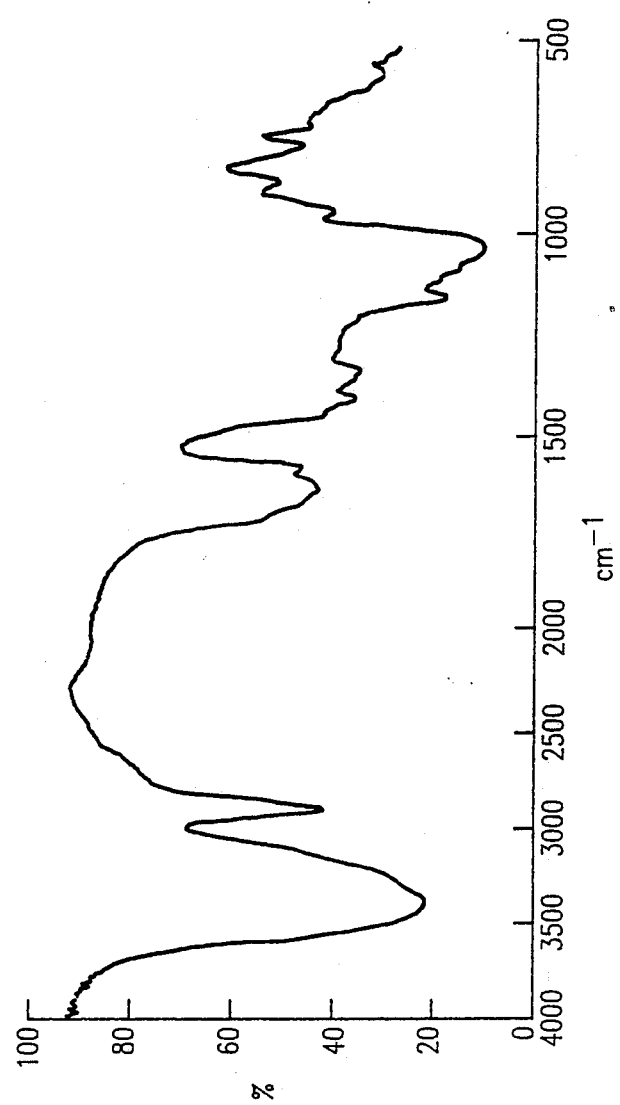
Figure 21:
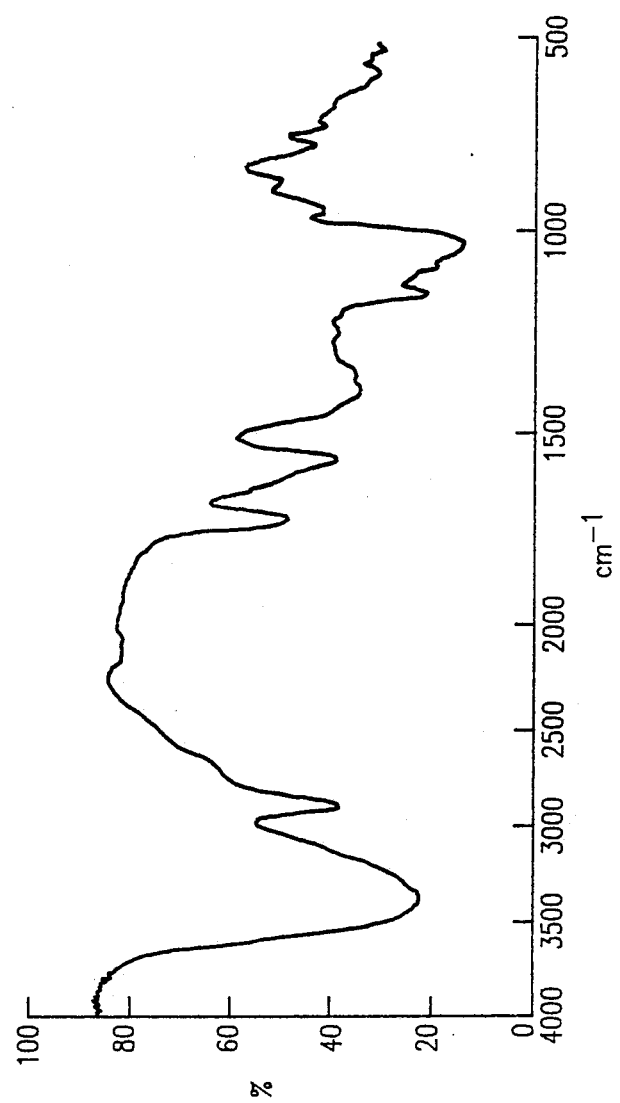
Figure 22:
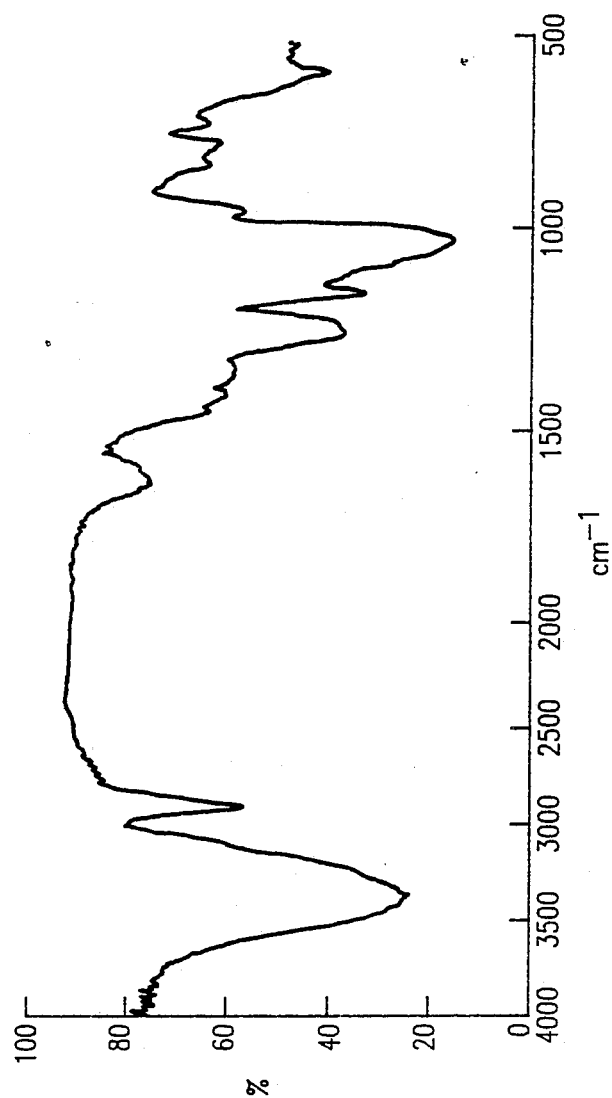
Figure 23:
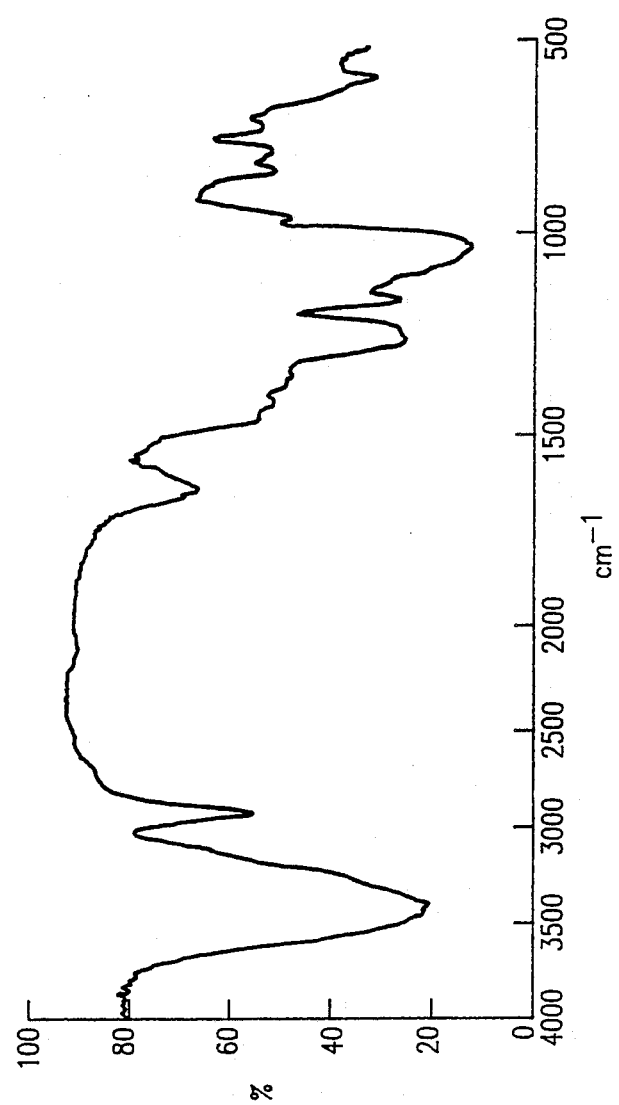
Figure 24:
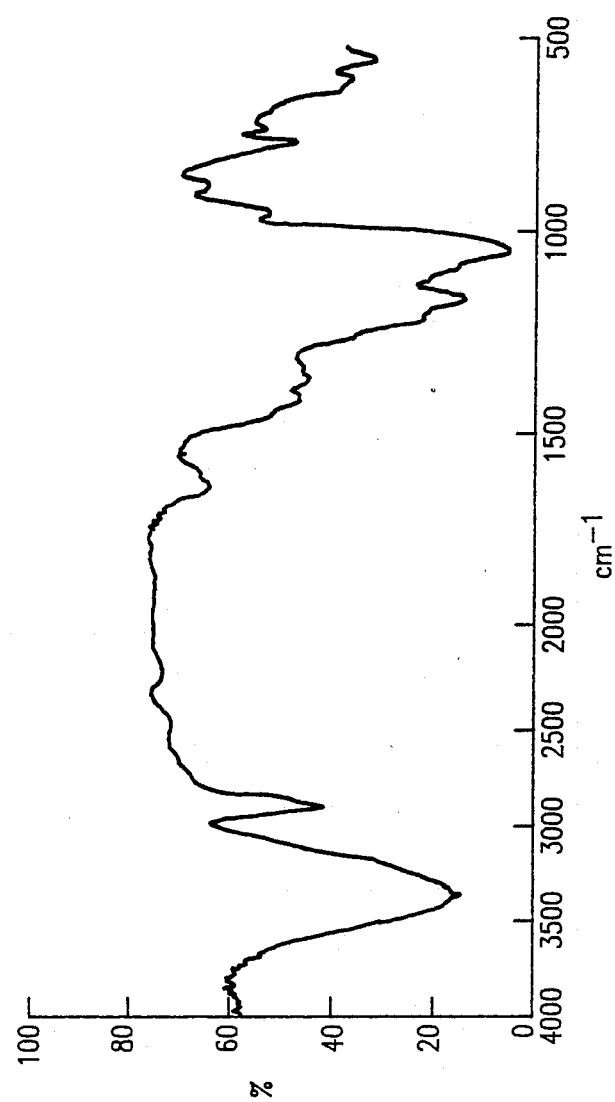
Figure 25:
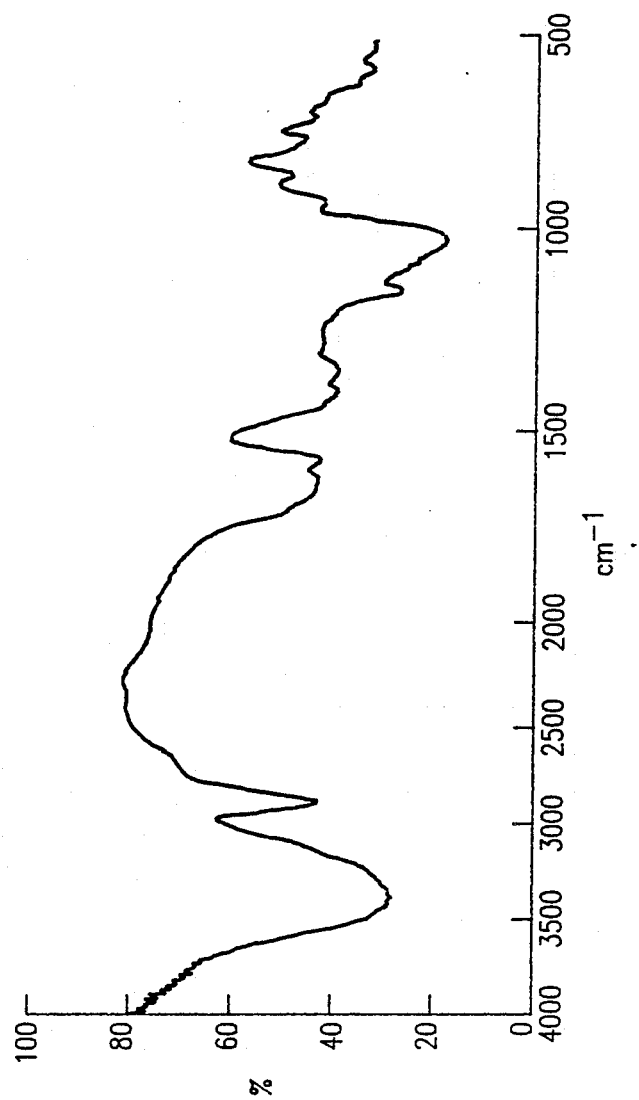
Figure 26:
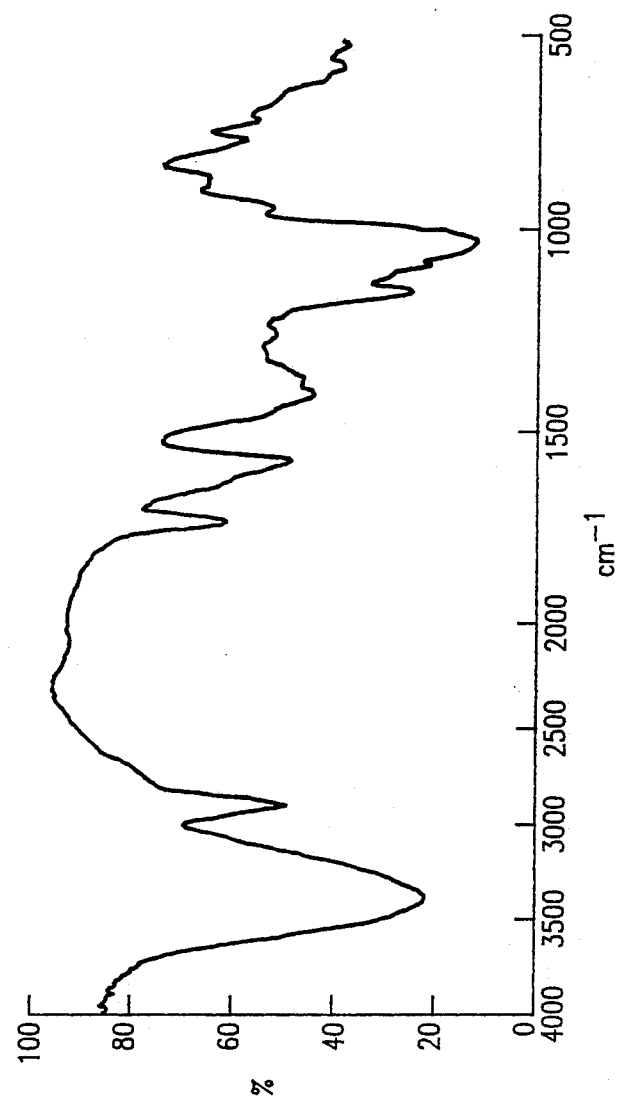
Figure 27:
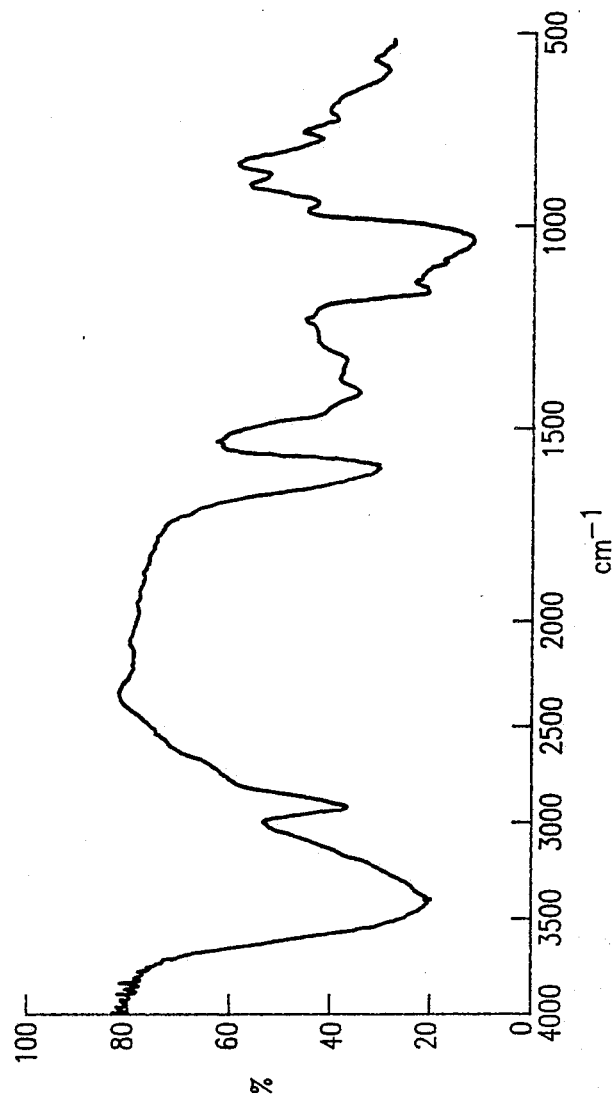
Figure 28:
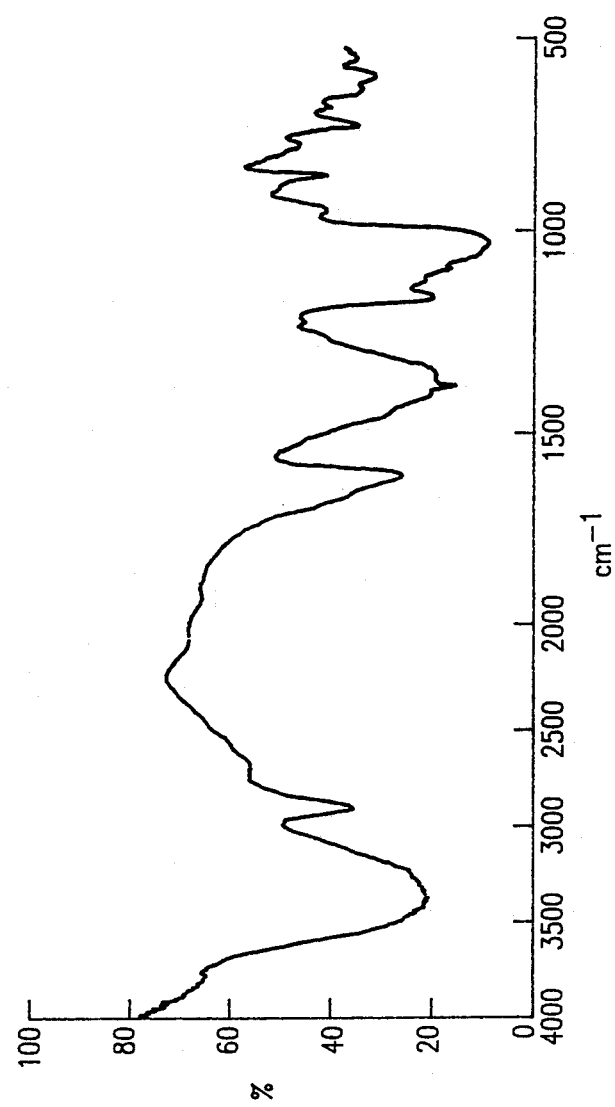
Figure 29:
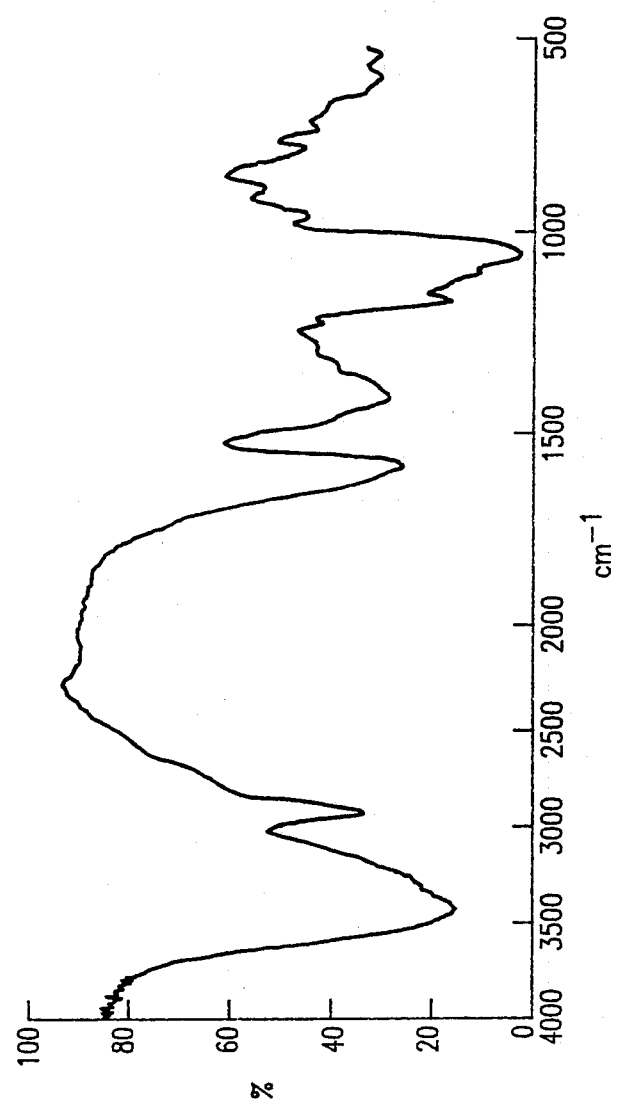
Figure 30:
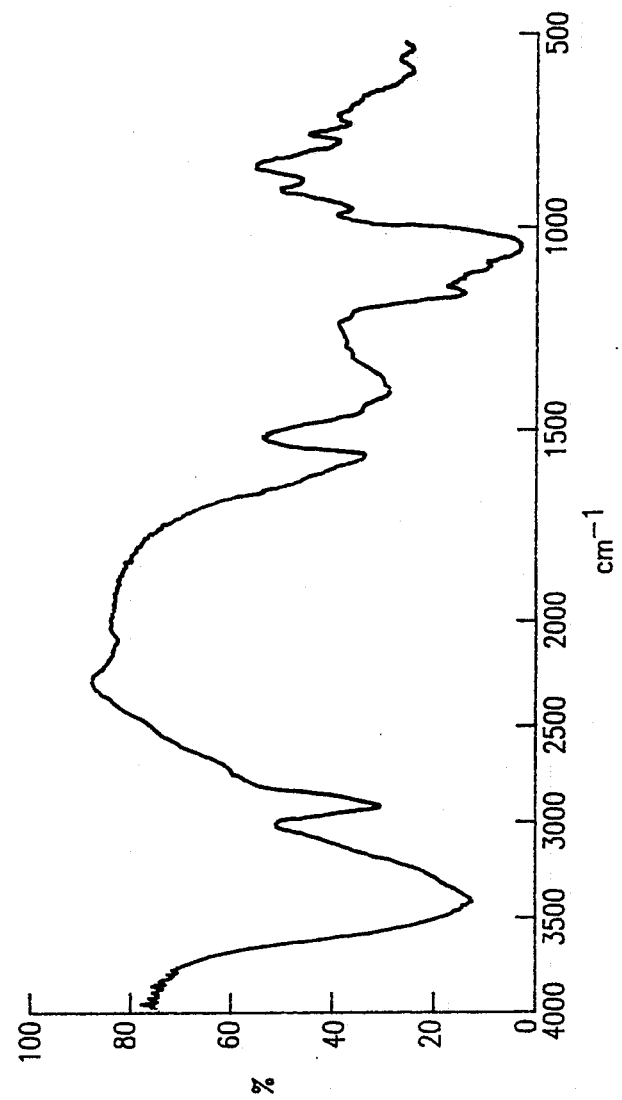
Figure 31:
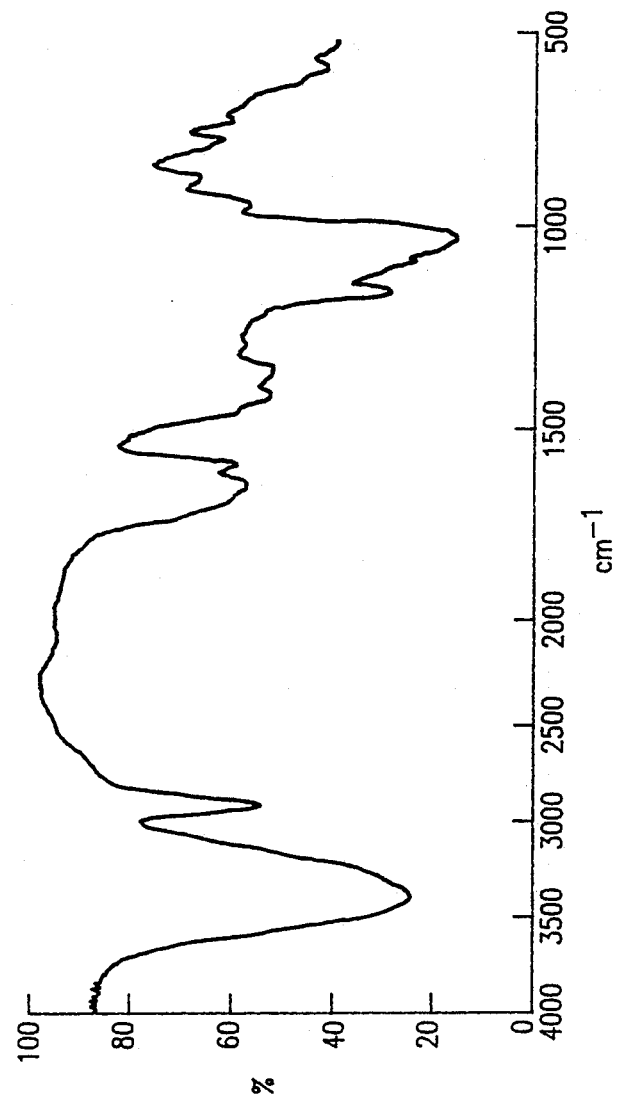
Figure 32:
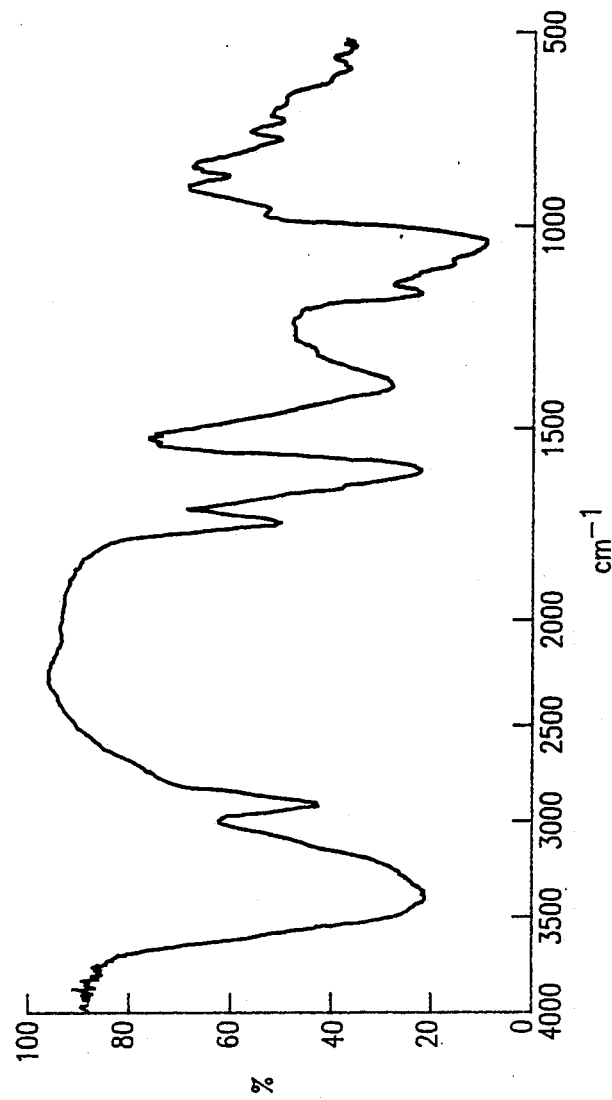
Figure 33:
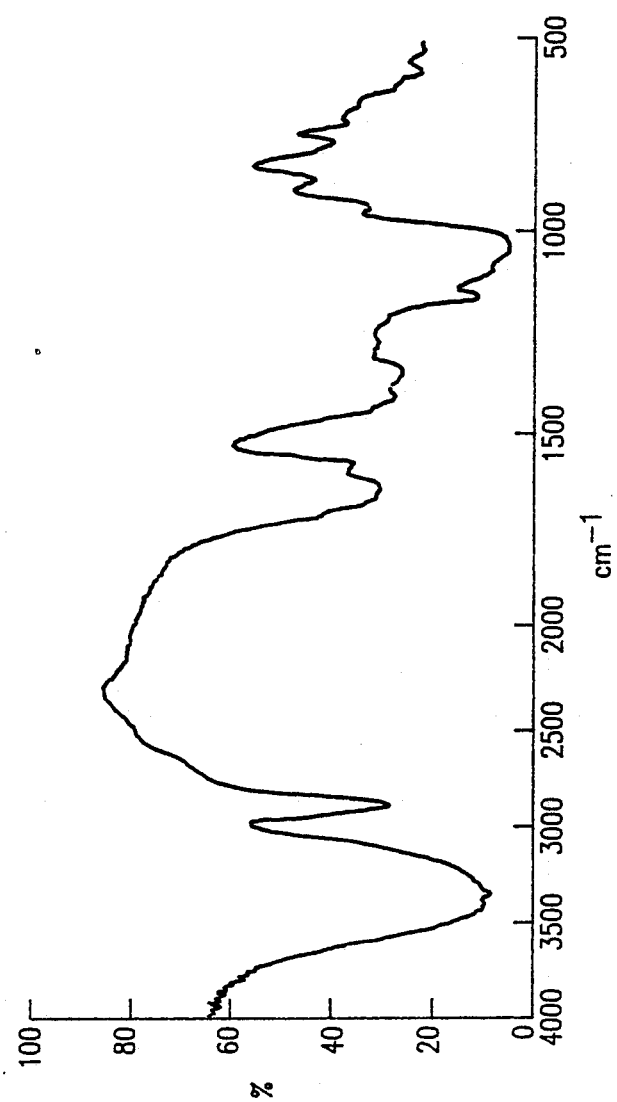
Figure 34:
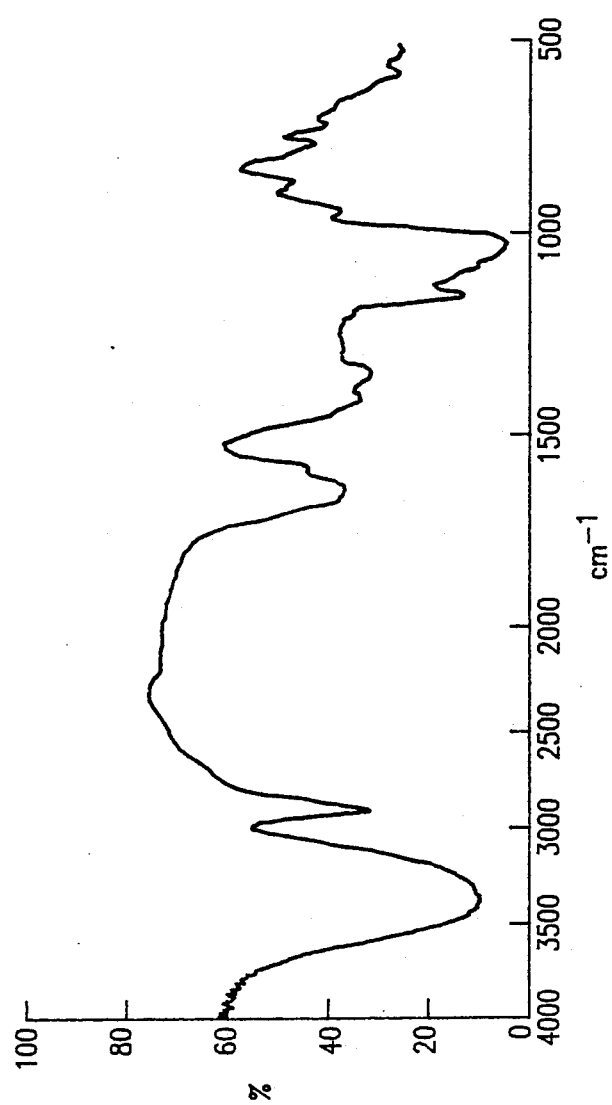
Figure 35:
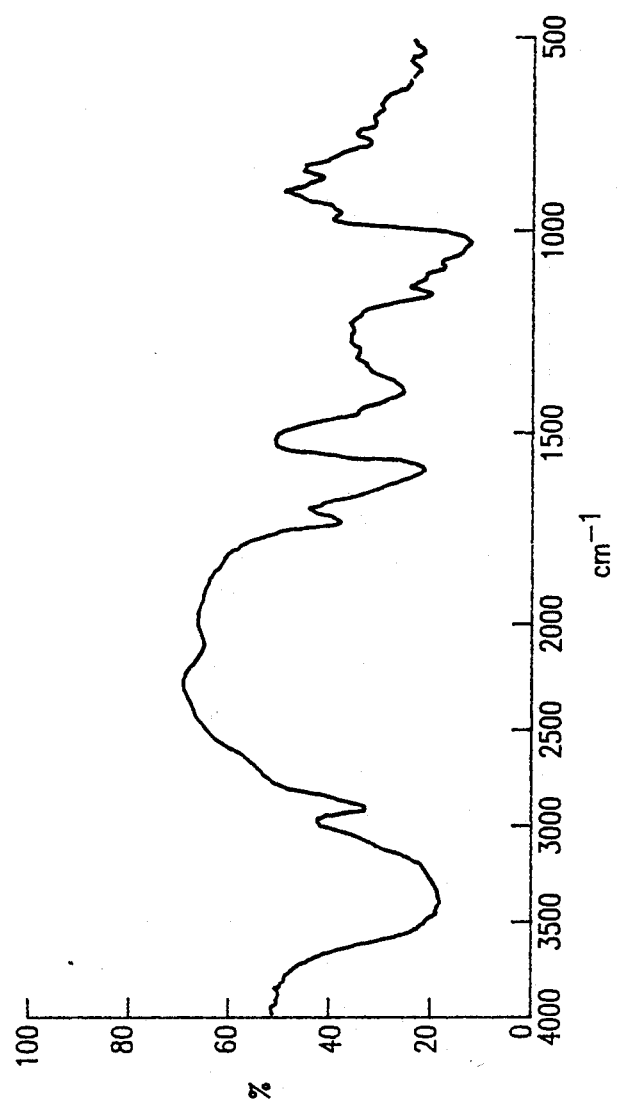
Figure 36:
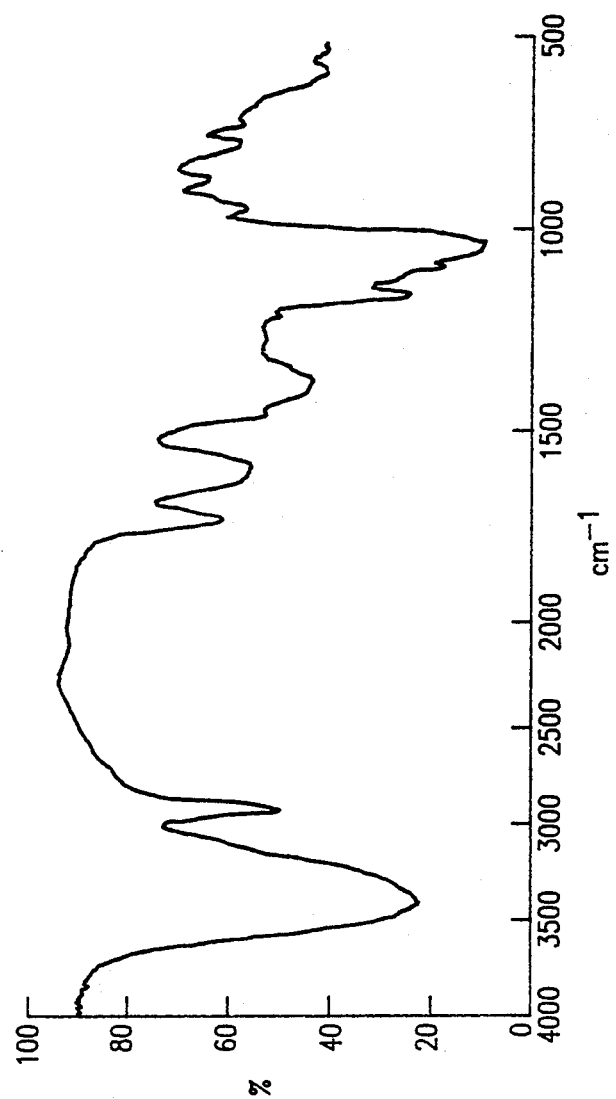
Figure 37:
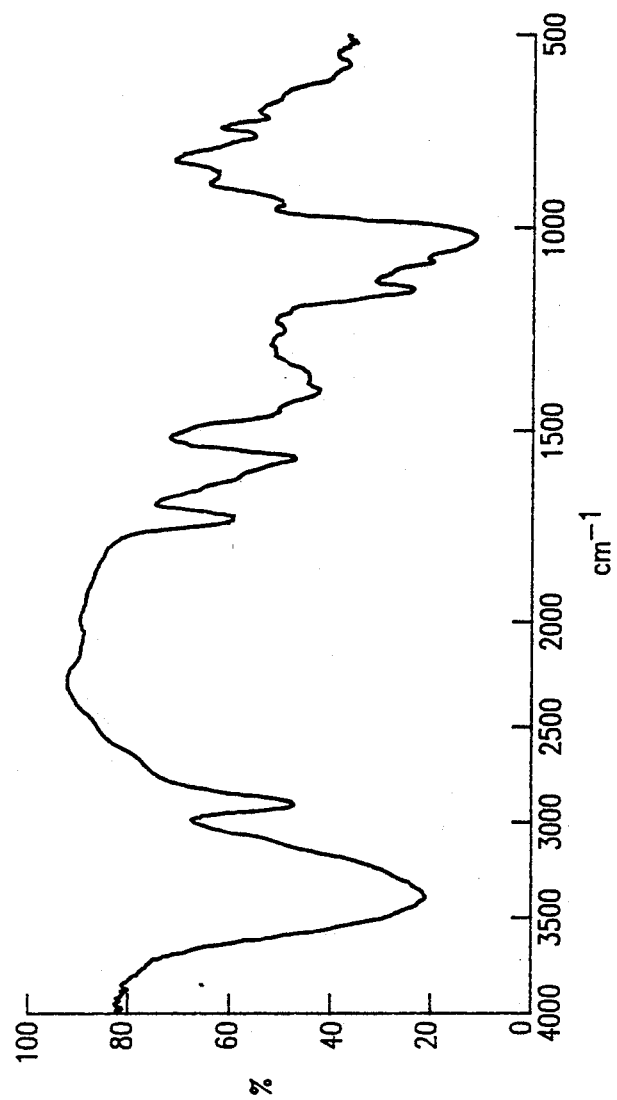
Figure 38:
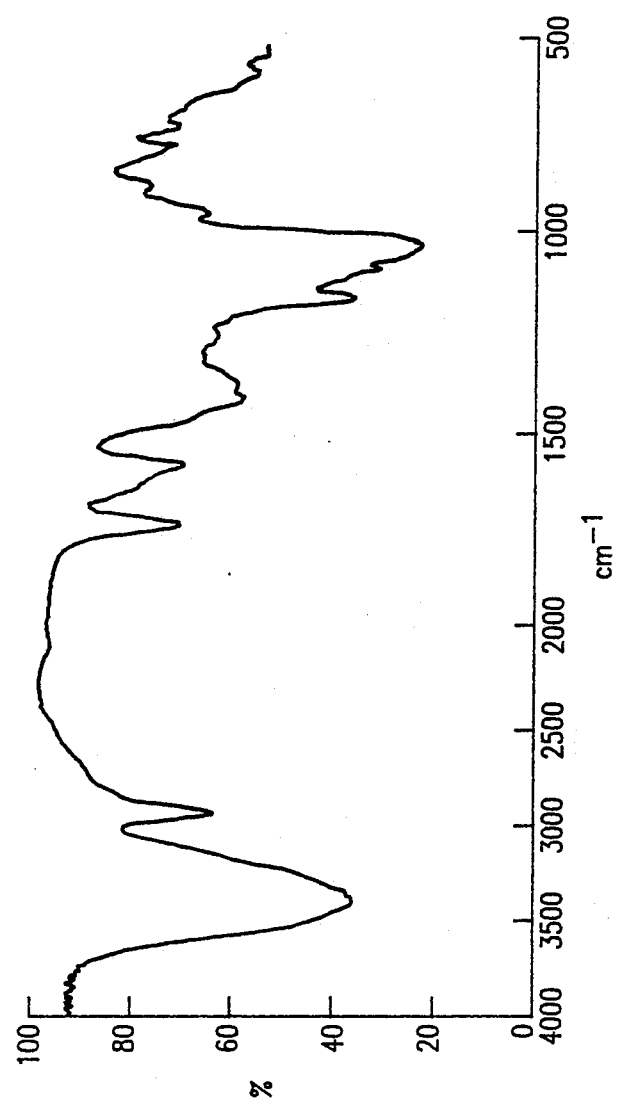
Figure 39:
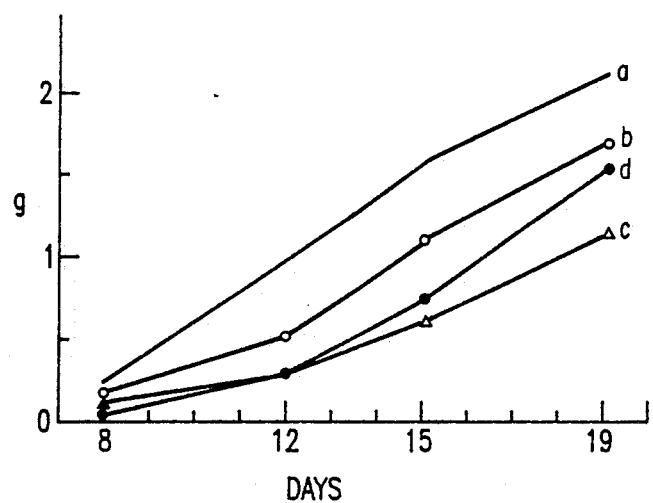
FIGS. 39 and 40 show the tumor growth inhibiting effects of certain test substances on mouse Colon 26 carcinoma as found in Test Example 2.
Figure 40:
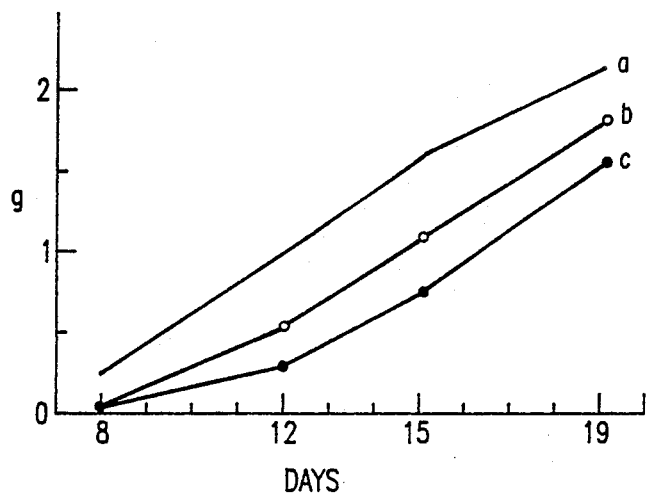
Figure 41:
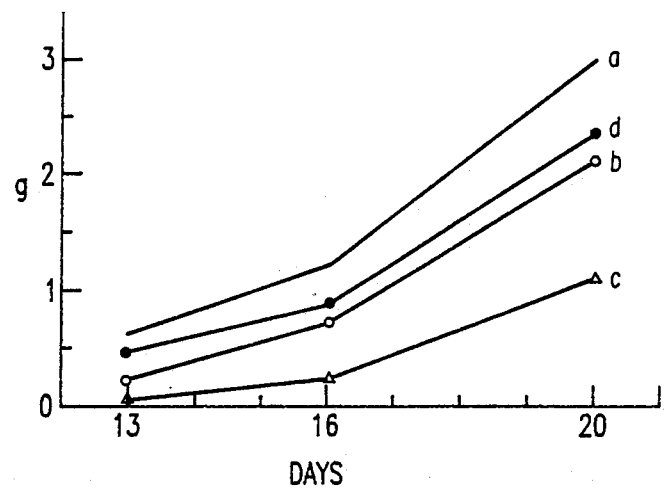
FIGS. 41–43 show the tumor growth inhibiting effects of certain test substances on mouse B16 melanoma as found in Test Example 3.
Figure 42:
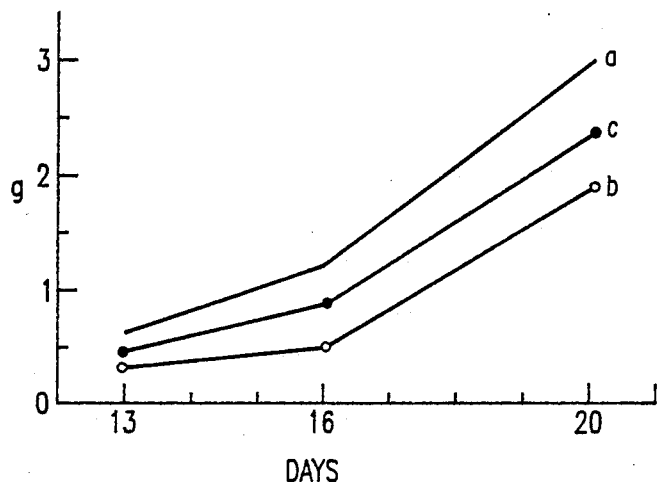
Figure 43:
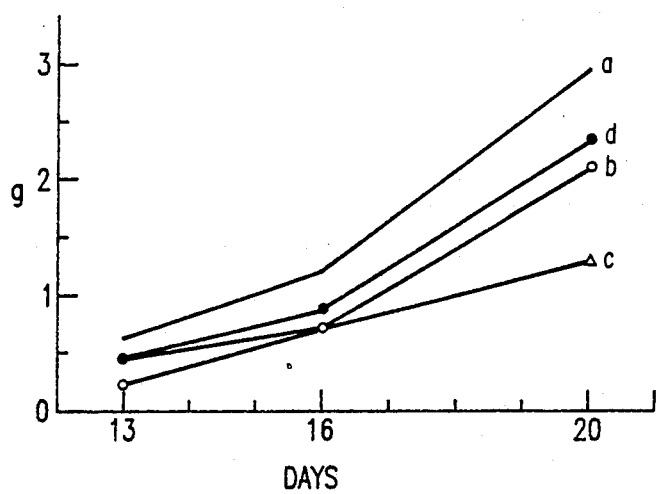
Figure 44:
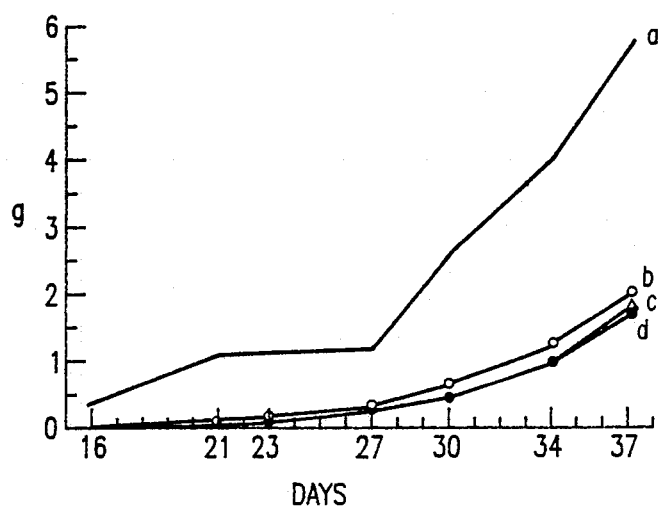
FIGS. 44 and 45 show the tumor growth inhibiting effects of certain test substances on mouse M5076 solid tumor as found in Test Example 4. In these figures, the abscissa indicates the time in days after transplantation of cancer cells and the ordinate indicates the tumor weight (g).
Figure 45:
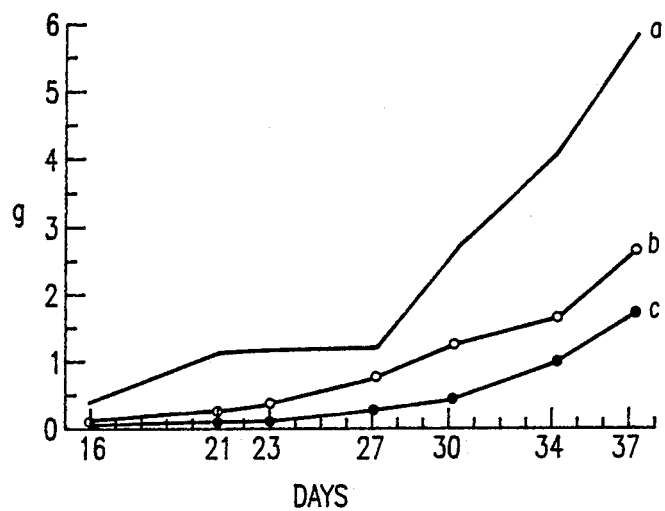

1,000 mg of each of the activated pullulans shown in Table 9 as obtained in the same manner as in the reference examples indicated was dissolved in a prescribed amount of water to give an aqueous activated pullulan solution. To the solution was added an aqueous solution of the counterpart platinum complex shown in Table 9 as obtained in the same manner as in the reference example indicated, and the mixture was stirred overnight at room temperature in a system protected from light. The reaction mixture obtained was subjected to gel filtration (packing: Sephadex G-25, Pharmacia; eluent: distilled water), and a high-molecular-weight eluate fraction was collected and lyophilized to give the desired macromolecular complex. The yield and platinum content of each macromolecular complex obtained are shown in Table 9. Infrared absorption spectra (FT-IR) of the complexes obtained in Examples 30 and 31 are shown in FIGS. 20 and 21, respectively.

TABLE 9

| Example No. | Activated pullulan (Ref. Example; mol. weight of pullulan) | Starting platinum complex (Reference Example) | Product macromolecular complex Yield (mg) Pt content (weight %) |
| --- | --- | --- | --- |
| 30 | Pullulan maleate sodium salt (5) (Ref. Example 7; 120,000) | cis-Sulfato(DACH)-platinum(II) (Ref. Example 22) | cis-Sulfato(DACH)platinum(II)/ cis-aqua(DACH)platinum(II) sulfate-pullulan maleate complex 790 Pt 5.4 |
| 31 | Pullulan succinate (50) (Ref. Example 8; 280,000) | cis-Dihydroxo(DACH)-platinum(II) (Ref. Example 20) | cis-Hydroxo(DACH)platinum(II)/ cis-aqua(DACH)platinum(II) hydroxide-pullulan succinate complex 840 Pt 2.3 |
| 32 | Pullulan succinate sodium salt (50) (Ref. Example 13; 120,000) | cis-Dinitrato(DACH)-platinum(II) (Ref. Example 17) | cis-Nitrato(DACH)platinum(II)/ cis-aqua(DACH)platinum(II) nitrate-pullulan succinate complex 920 Pt 3.8 |

Examples 33-59

1,000 mg of each of the activated pullulans shown in Table 10-1 as obtained in the reference examples indicated was dissolved in a prescribed amount of water to give an aqueous activated pullulan solution. To the solution was added an aqueous solution of the counterpart platinum complex shown in Table 10-1 as obtained in the same manner as in the reference example indicated, and the mixture was stirred overnight at room temperature in a system protected from light. To the reaction mixture obtained, there was added a prescribed amount of the anion-forming compound shown in Table 10-1, and the mixture was stirred at room temperature. When sodium bicarbonate, ammonium bicarbonate or barium hydroxide was used as the anion-forming compound, stirring was performed for about 5 hours after addition thereof. When sodium chloride or sodium acetate was used, stirring was conducted overnight after addition thereof. When barium hydroxide was used, a saturated aqueous solution thereof was added until the pH of the reaction mixture became 12.0. Thereafter, when there was a precipitate in the reaction mixture, said precipitate was removed on a centrifuge. Then, the reaction mixture was subjected to gel filtration (packing: Sephadex G-25, Pharmacia; eluent: distilled water), and a high-molecular-weight eluate fraction was collected and lyophilized to give the desired macromolecular complex shown in Table 10-2. In Example 42, since the resultant reaction mixture was viscous, it was subjected to reprecipitation treatment using methanol to give the desired macromolecular complex. The yield and platinum content of each macromolecular complexes obtained are shown in Table 10-2. In the table, in the product column, the macromolecular complex obtained in each example is given in terms of predominant structures thereof, and said macromolecular complex structurally includes in part the nitrato coordination form and/or the aqua corresponding coordination form. Infrared absorption spectra (FT-IR) of the macromolecular complexes obtained in Examples 34, 35, 38, 40, 43, 47, 49, 50, 51, 52, 54, 58 and 59 are shown in FIGS. 22-34, respectively.

TABLE 10-1

| Example No. | Activated pullulan (quantity of water, ml) (Reference Example; molecular weight of pullulan) | Starting platinum complex (Reference Example) | Anion-forming compound mg (mmole) |
| --- | --- | --- | --- |
| 33 | Pullulan sulfate sodium salt (40) (Ref. Example 1; 30,000) | cis-Dinitrato(DACH)-platinum(II) (Ref. Example 17) | NH$_4$HCO$_3$ 750 (9.5) |
| 34 | Pullulan sulfate sodium salt (40) (Ref. Example 1; 60,000) | cis-Dinitrato(DACH)-platinum(II) (Ref. Example 17) | NaHCO$_3$ 800 (9.5) |
| 35 | Pullulan sulfate sodium salt (40) (Ref. Example 1; 120,000) | cis-Dinitrato(DACH)-platinum(II) (Ref. Example 17) | NaHCO$_3$ 800 (9.5) |
| 36 | Pullulan sulfate sodium salt (40) (Ref. Example 1; 120,000) | cis-Dinitrato(R-2-amino-methylpyrrolidine)platinum(II) (Ref. Example 24) | NaHCO$_3$ 800 (9.5) |
| 37 | Sulfoethylpullulan sodium salt (40) (Ref. Example 5; 60,000) | cis-Dinitrato(DACH)platinum(II) (Ref. Example 17) | NaHCO$_3$ 800 (9.5) |

TABLE 10-1-continued

| Example No. | Activated pullulan (quantity of water, ml) (Reference Example; molecular weight of pullulan) | Starting platinum complex (Reference Example) | Anion-forming compound mg (mmole) |
|---|---|---|---|
| 38 | Sulfoethylpullulan sodium salt (40) (Ref. Example 5; 120,000) | cis-Dinitrato(DACH)-platinum(II) (Ref. Example 17) | NaHCO$_3$ 800 (9.5) |
| 39 | Sulfoethylpullulan sodium salt (40) (Ref. Example 5; 280,000) | cis-Dinitratodiammine-platinum(II) (Ref. Example 23) | NaHCO$_3$ 800 (9.5) |
| 40 | Pullulan maleate sodium salt (40) (Ref. Example 7; 60,000) | cis-Dinitrato(DACH)-platinum(II) (Ref. Example 17) | NaHCO$_3$ 800 (9.5) |
| 41 | Pullulan maleate sodium salt (40) (Ref. Example 7; 120,000) | cis-Dinitrato(DACH)-platinum(II) (Ref. Example 17) | NaHCO$_3$ 800 (9.5) |
| 42 | Pullulan maleate (40) (Ref. Example 6; 61,000) | cis-Dinitrato(DACH)-platinum(II) (Ref. Example 17) | NaHCO$_3$ 1000 (11.9) |
| 43 | Pullulan succinate (50) (Ref. Example 8; 60,000) | cis-Dinitrato(DACH)-platinum(II) (Ref. Example 17) | NaHCO$_3$ 800 (9.5) |
| 44 | Pullulan succinate sodium salt (50) (Ref. Example 13; 60,000) | cis-Dinitrato(DACH)-platinum(II) (Ref. Example 17) | NaHCO$_3$ 800 (9.5) |
| 45 | Pullulan tetrahydrofuran-2,3,4,5-tetracarboxylate sodium salt (70) (Ref. Example 10; 280,000) | cis-Dinitrato(DACH)-platinum(II) (Ref. Example 17) | NaHCO$_3$ 800 (9.5) |
| 46 | Pullulan cis,cis,cis,cis-1,2,3,4-cyclopentanetetra-carboxylate sodium salt (70) (Ref. Example 11; 60,000) | cis-Dinitrato(DACH)-platinum(II) (Ref. Example 17) | NaHCO$_3$ 800 (9.5) |
| 47 | Carboxymethylpullulan sodium salt (60) (Ref. Example 14; 30,000) | cis-Dinitrato(DACH)-platinum(II) (Ref. Example 17) | NaHCO$_3$ 800 (9.5) |
| 48 | Carboxymethylpullulan sodium salt (60) (Ref. Example 14; 60,000) | cis-Dinitrato(DACH)-platinum(II) (Ref. Example 17) | NaHCO$_3$ 800 (9.5) |
| 49 | Carboxymethylpullulan sodium salt (60) (Ref. Example 14; 120,000) | cis-Dinitrato(DACH)-platinum(II) (Ref. Example 17) | NaHCO$_3$ 800 (9.5) |
| 50 | Carboxyethylpullulan sodium salt (70) (Ref. Example 15; 60,000) | cis-Dinitrato(DACH)-platinum(II) (Ref. Example 17) | NaHCO$_3$ 800 (9.5) |
| 51 | Carboxybutylpullulan sodium salt (60) (Ref. Example 16; 120,000) | cis-Dinitrato(DACH)-platinum(II) (Ref. Example 17) | NaHCO$_3$ 800 (9.5) |
| 52 | Pullulan maleate sodium salt (40) (Ref. Example 7; 60,000) | cis-Dinitrato(DACH)-platinum(II) (Ref. Example 17) | NaCl 120 (2.0) |
| 53 | Pullulan succinate sodium salt (50) | cis-Dinitrato(R-2-aminomethyl-pyrrolidine)platinum(II) (Ref. Example 24) | NaCl 120 (2.0) |

TABLE 10-1-continued

| Example No. | Activated pullulan (quantity of water, ml) (Reference Example; molecular weight of pullulan) | Starting platinum complex (Reference Example) | Anion-forming compound mg (mmole) |
|---|---|---|---|
| 54 | (Ref. Example 13; 280,000) Pullulan tetrahydrofuran-2,3,4,5-tetracarboxylate sodium salt (80) | cis-Dinitrato(DACH)-platinum(II) (Ref. Example 17) | NaCl 120 (2.0) |
| 55 | (Ref. Example 10; 60,000) Pullulan succinate sodium salt (50) | cis-Dinitrato(DACH)-platinum(II) (Ref. Example 17) | NaCl 120 (2.0) |
| 56 | (Ref. Example 13; 120,000) Carboxymethylpullulan sodium salt (60) | cis-Dinitrato(DACH)-platinum(II) (Ref. Example 17) | NaCl 120 (2.0) |
| 57 | (Ref. Example 14; 280,000) Carboxyethylpullulan sodium salt (60) | cis-Dinitrato(2-methyl-1,4-butanediamine)platinum(II) (Ref. Example 25) | NaCl 120 (2.0) |
| 58 | (Ref. Example 15; 60,000) Pullulan maleate sodium salt (40) | cis-Dinitrato(DACH)-platinum(II) (Ref. Example 17) | $CH_3COONa \cdot 3H_2O$ 540 (4.0) |
| 59 | (Ref. Example 7; 60,000) Pullulan maleate sodium salt (40) (Ref. Example 7; 120,000 | cis-Dinitrato(DACH)-platinum(II) (Ref. Example 17) | $Ba(OH)_2$ (Reaction mixture, pH 12.0) |

TABLE 10-2

| Example No. | Product macromolecular complex Yield (mg) Pt content (weight %) |
|---|---|
| 33 | cis-Hydrogencarbonato(DACH)platinum(II)/cis-aqua(DACH)platinum(II) hydrogencarbonate-pullulan sulfate complex 910 Pt 3.0 |
| 34 | cis-Hydrogencarbonato(DACH)platinum(II)/cis-aqua(DACH)platinum(II) hydrogencarbonate-pullulan sulfate complex 960 Pt 5.1 |
| 35 | cis-Hydrogencarbonato(DACH)platinum(II)/cis-aqua(DACH)platinum(II) hydrogencarbonate-pullulan sulfate complex 920 Pt 2.7 |
| 36 | cis-Hydrogencarbonato(R-2-aminomethyl-pyrrolidine)platinum(II)/cis-aqua(R-2-aminomethylpyrrolidine)platinum(II) hydrogencarbonate-pullulan sulfate complex 860 Pt. 3.4 |
| 37 | cis-Hydrogencarbonato(DACH)platinum(II)/cis-aqua(DACH)platinum(II) hydrogencarbonate-sulfoethyl pullulan complex 880 Pt 4.0 |
| 38 | cis-Hydrogencarbonato(DACH)platinum(II)/cis-aqua(DACH)platinum(II) hydrogencarbonate-sulfoethyl pullulan complex 880 Pt 3.1 |
| 39 | cis-Hydrogencarbonatodiammineplatinum(II)/cis-aquadiammineplatinum(II) hydrogencarbonate-sulfoethyl pullulan complex 840 Pt 4.0 |
| 40 | cis-Hydrogencarbonato(DACH)platinum(II)/cis- |

TABLE 10-2-continued

| Example No. | Product macromolecular complex<br>Yield (mg)<br>Pt content (weight %) |
|---|---|
| | aqua(DACH)platinum(II) hydrogencarbonate-<br>pullulan maleate complex<br>710<br>Pt 6.0 |
| 41 | cis-Hydrogencarbonato(DACH)platinum(II)/cis-<br>aqua(DACH)platinum(II) hydrogencarbonate-<br>pullulan maleate complex<br>910<br>Pt 5.0 |
| 42 | cis-Hydrogencarbonato(DACH)platinum(II)/cis-<br>aqua(DACH)platinum(II) hydrogencarbonate-<br>pullulan maleate complex<br>760<br>Pt 4.7 |
| 43 | cis-Hydrogencarbonato(DACH)platinum(II)/cis-<br>aqua(DACH)platinum(II) hydrogencarbonate-<br>pullulan succinate complex<br>850<br>Pt 2.7 |
| 44 | cis-Hydrogencarbonato(DACH)platinum(II)/cis-<br>aqua(DACH)platinum(II) hydrogencarbonate-<br>pullulan succinate complex<br>710<br>Pt 3.1 |
| 45 | cis-Hydrogencarbonato(DACH)platinum(II)/cis-<br>aqua(DACH)platinum(II) hydrogencarbonate/cis-<br>(DACH)platinum(II)-pullulan tetrahydrofuran-<br>2,3,4,5-tetracarboxylate complex<br>830<br>Pt 2.7 |
| 46 | cis-Hydrogencarbonato(DACH)platinum(II)/cis-<br>aqua(DACH)platinum(II) hydrogencarbonate/cis-<br>(DACH)platinum(II)-pullulan cis,cis,cis,cis-<br>1,2,3,4-cyclopentanetetracarboxylate comnplex<br>780<br>Pt 3.9 |
| 47 | cis-Hydrogencarbonato(DACH)platinum(II)/cis-<br>aqua(DACH)platinum(II) hydrogencarbonate-<br>carboxymethylpullulan complex<br>840<br>Pt 3.1 |
| 48 | cis-Hydrogencarbonato(DACH)platinum(II)/cis-<br>aqua(DACH)platinum(II) hydrogencarbonate-<br>carboxymethylpullulan complex<br>900<br>Pt 4.4 |
| 49 | cis-Hydrogencarbonato(DACH)platinum(II)/cis-<br>aqua(DACH)platinum(II) hydrogencarbonate-<br>carboxymethylpullulan complex<br>830<br>Pt 3.8 |
| 50 | cis-Hydrogencarbonato(DACH)platinum(II)/cis-<br>aqua(DACH)platinum(II) hydrogencarbonate-<br>carboxyethylpullulan complex<br>830<br>Pt 6.2 |
| 51 | cis-Hydrogencarbonato(DACH)platnum(II)/cis-<br>aqua(DACH)platinum(II) hydrogencarbonate-<br>carboxybutylpullulan complex<br>980<br>Pt 2.3 |
| 52 | cis-Chloro(DACH)platinum(II)/cis-aqua(DACH)-<br>platinum(II) chloride-pullulan maleate complex<br>870<br>Pt 4.3 |
| 53 | cis-Chloro(R-2-aminomethylpyrrolidine)platinum(II)/<br>cis-aqua(R-2-aminomethylpyrrolidine)platinum(II)<br>chloride-pullulan succinate complex<br>880<br>Pt 4.1 |
| 54 | cis-Chloro(DACH)platinum(II)/cis-aqua(DACH)platinum-<br>(II) chloride/cis-(DACH)platinum(II)-pullulan<br>tetrahydrofuran-2,3,4,5-tetracarboxylate complex<br>800<br>Pt 4.8 |
| 55 | cis-Chloro(DACH)platinum(II)/cis-aqua(DACH)platinum-<br>(II) chloride-pullulan succinate complex<br>820<br>Pt 2.2 |

TABLE 10-2-continued

| Example No. | Product macromolecular complex<br>Yield (mg)<br>Pt content (weight %) |
|---|---|
| 56 | cis-Chloro(DACH)platinum(II)/cis-aqua(DACH)platinum-(II) chloride-carboxymethylpullulan complex<br>720<br>Pt 2.8 |
| 57 | cis-Chloro(2-methyl-1,4-butanediamine)platinum(II)/cis-aqua(2-methyl-1,4-butanediamine)platinum(II) chloride-carboxyethylpullulan complex<br>910<br>Pt 3.9 |
| 58 | cis-Acetato(DACH)platinum(II)/cis-aqua(DACH)platinum-(II) acetate-pullulan maleate complex<br>720<br>Pt 5.6 |
| 59 | cis-Hydroxo(DACH)platinum(II)/cis-aqua(DACH)platinum-(II) hydroxide-pullulan maleate complex<br>950<br>Pt 7.1 |

Examples 60–65

1,000 mg of each of the activated pullulans shown in Table 11 as obtained in the same manner as in the reference examples indicated was dissolved in a prescribed amount of water. To the thus-prepared aqueous activated pullulan solution was added an aqueous solution of cis-dinitrato(DACH)platinum(II) as obtained in the same manner as in Example 17, and the mixture was stirred overnight at room temperature in a system protected from light. The reaction mixture was dialyzed for 2 days using a dialysis membrane (tube size 30/32, Union Carbide Corp.), and the dialyzate was lyophilized.

To the lyophilizate obtained, there was added 100 ml of physiological saline, and the mixture was heated at about 50° C. for about 30 minutes to cause dissolution. The thus-obtained solution was again subjected to the same dialysis and lyophilization as mentioned above to give the desired macromolecular complex. The yield and platinum content of each macromolecular complex thus obtained are shown in Table 11. In the table, in the product column, the macromolecular complex obtained in each example is given in terms of predominant structures thereof, and said macromolecular complex structurally includes in part the nitrato coordination form and/or the corresponding aqua coordination form. Infrared absorption spectra (FT-IR) of the macromolecular complexes obtained in Examples 61, 62, 63 and 64 are shown in FIGS. 35–38, respectively.

TABLE 11

| Example No. | Activated pullulan<br>(quantity of water, ml)<br>(Reference Example, mol. weight of pullulan) | Product macromolecular complex<br>Yield (mg)<br>Pt content (weight %) |
|---|---|---|
| 60 | Pullulan maleate sodium salt<br>(40)<br>(Ref. Example 7; 60,000) | cis-Chloro(DACH)platinum(II)/cis-aqua(DACH)platinum(II) chloride-pullulan maleate complex<br>1040<br>Pt 4.3 |
| 61 | Pullulan tetrahydrofuran-2,3,4,5-tetracarboxylate sodium salt<br>(80)<br>(Ref. Example 10; 60,000) | cis-Chloro(DACH)platinum(II)/cis-aqua(DACH)platinum(II) chloride/cis-(CACH)platinum(II)-pullulan tetrahydrofuran-2,3,4,5-tetracarboxylate complex<br>980<br>Pt 4.5 |
| 62 | Pullulan cis,cis,cis,cis,-1,2,3,4-cyclopentanetetracarboxylate sodium salt<br>(80)<br>(Ref. Example 11; 60,000) | cis-Chloro(DACH)platinum(II)/cis-aqua(DACH)platinum(II) chloride/cis-(DACH)platinum(II)-pullulan cis,cis,cis,cis,-1,2,3,4-cyclopentanetetracarboxylate complex<br>1010<br>Pt 5.0 |
| 63 | Pullulan 1,2,3-propanetricarboxylate sodium salt<br>(50)<br>(Ref. Example 12; 60,000) | cis-Chloro(DACH)platinum(II)/cis-aqua(DACH)platinum(II) chloride-cis-(DACH)platinum(II)-pullulan 1,2,3-propanetricarboxylate complex<br>990<br>Pt 1.5 |
| 64 | Pullulan succinate sodium salt<br>(40)<br>(Ref. Example 13; 60,000) | cis-Chloro(DACH)platinum(II)/cis-aqua(DACH)platinum(II) chloride-pullulan succinate complex<br>970<br>Pt 1.6 |
| 65 | Carboxymethylpullulan sodium salt<br>(40) | cis-Chloro(DACH)platinum(II)/cis-aqua(DACH)platinum(II) chloride-carboxymethylpullulan complex |

TABLE 11-continued

| Example No. | Activated pullulan (quantity of water, ml) (Reference Example, mol. weight of pullulan) | Product macromolecular complex Yield (mg) Pt content (weight %) |
|---|---|---|
| | (Ref. Example 14; 30,000) | 980 Pt 4.8 |

Comparative Example 1

1,000 mg of dextran sulfate sodium salt (Sigma; molecular weight: about 5,000) was dissolved in 40 ml of water. To the solution obtained was added an aqueous solution of cis-dinitrato(DACH)platinum(II) as obtained in the same manner as in Reference Example 17, and the mixture was stirred overnight at room temperature in a system protected from light. The reaction mixture was dialyzed for 1 day using a dialysis membrane (tube size 30/32, Union Carbide Corp.), and the dialyzate was lyophilized to give 1,180 mg of cis-nitrato(DACH)-platinum(II)/cis-aqua(DACH)-platinum(II) nitrate-dextran sulfate complex. The platinum content of this macromolecular complex was 8.8% by weight and the sulfur content was 13.0% by weight.

When stored for a long period, the thus-obtained macromolecular complex turned into a brown syrup, showing its insufficient stability.

Comparative Example 2

Carboxymethylcellulose sodium salt was synthesized by the method described in "Kobunshi Kagaku Jikkenho (Experimental Methods in Macromolecular Chemistry)" (edited by Yoshio Iwakura, Asakura Shoten, 1968), page 216. Thus, 15.0 g of powdery cellulose was added to 400 ml of isopropanol, the mixture was vigorously stirred in a nitrogen atmosphere, 50 g of 30% aqueous sodium hydroxide solution was added over 15 minutes, and stirring was continued for further 30 minutes. To the reaction mixture, there was added a solution of 17.5 g of monochloroacetic acid in 50 ml of isopropanol over 30 minutes. The resultant mixture was then stirred at about 60° C. for 4 hours.

The reaction mixture was neutralized with glacial acetic acid with phenolphthalein as an indicator, and then filtered. The solid matter obtained was dispersed in 400 ml of 80% aqueous methanol at a temperature of about 60° C., then recovered by filtration and washed with methanol containing a small amount of water. This series of operations (dispersion in aqueous methanol, recovery by filtration and washing) was repeated three times. The solid finally obtained was washed with methanol and then dried at a temperature of about 50° C. under reduced pressure to give 22.8 g of carboxymethylcellulose sodium salt as a powder.

1,000 mg of the thus-obtained carboxymethylcellulose sodium salt was dissolved in 60 ml of water. To the solution obtained, there was added dropwise with stirring an aqueous solution of cis-dinitrato(DACH)-platinum(II) as obtained in the same manner as in Reference Example 17. Before completion of the dropping, however, the reaction mixture entirely turned into a gel. The desired water-soluble macromolecular complex could not be obtained.

In the above-mentioned process for synthesizing carboxymethylcellulose sodium salt, the degree of carboxymethyl group substitution was reduced by decreasing charge of monochloroacetic acid to half. In that case, only about half of the product was soluble in water.

In the following, preparation examples are given in which the macromolecular complex according to the invention as obtained in Example 24, 35 or 38 was used as an active ingredient.

EXAMPLE 66

An injectable solution was prepared in the following manner.

400 mg of the macromolecular complex obtained in Example 35 was dissolved in distilled water for injection to give 40 ml of 1% aqueous solution and the aqueous solution obtained was filtered through a sterile micropore filter. The filtrate was filled into a sterile amber-colored glass bottle.

EXAMPLE 67

An injectable solution was prepared in the following manner.

400 mg of the macromolecular complex obtained in Example 38 was dissolved in distilled water for injection to give 40 ml of 1% aqueous solution. The aqueous solution obtained was filtered through a sterile micropore filter. The filtrate was filled in a sterile amber-colored glass bottle.

Example 68

An injectable solution was prepared in the following manner.

300 mg of the macromolecular complex obtained in Example 24 was dissolved in distilled water for injection to give 60 ml of 0.5% aqueous solution. The aqueous solution obtained was filtered through a sterile micropore filter. The filtrate was filled into a sterile amber-colored glass bottle.

INDUSTRIAL APPLICABILITY

In accordance with the present invention, there are provided novel macromolecular complexes which are useful as drugs.

The macromolecular complexes provided by the invention are soluble in water and, as is evident from the test results mentioned hereinabove, they have excellent anticancer activity. Furthermore, they are low in toxicity.

What is claimed is:

1. A pullulan derivative having a plurality of active sites resulting from the reaction of pullulan within a reactant having a reactive acid moiety selected from the group consisting of sulfuric acid, phosphoric acid, a sulfonic acid and a carboxylic acid, wherein (A) one hydrogen atom of the group of the formula:

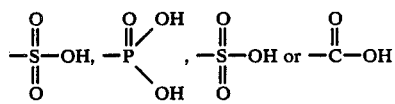

occurring at some but not all of said active sites is substituted by a group of the formula

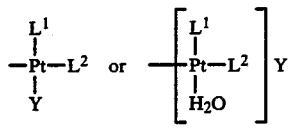

wherein $L^1$ and $L^2$ each independently is amine or a unidentate ligand amine or combinedly represent a bidentate ligand amine and Y is an anionic ligand, or (D) two hydrogen atoms of the group

or of two

groups bound to one and the same carbon atom or to two neighboring carbon atoms as occurring at said active sites are, each independently, partly substituted by a group of the formula

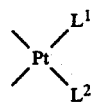

wherein $L^1$ and $L^2$ are as defined above, or both (A)+(B) hydrogen substitutions are present, or a pharmacologically acceptable salt thereof.

2. The pullulan derivative of claim 1, wherein said pullulan derivative has a plurality of active sites resulting from introduction of a carboxylic acid.

3. The pullulan derivative of claim 2, wherein said carboxylic acid is a polybasic acid having two or more carboxyl groups.

4. The pullulan derivative of claim 3, wherein said polybasic acid is succinic acid, maleic acid, cis-aconitic acid, tetrahydrofuran-2,3,4,5-tetracarboxylic acid or 1,2,3,4-cyclopentanetetracarboxylic acid.

5. The pullulan derivative of claim 1 wherein $L^1$ and $L^2$ represent combined 1,2-diaminocyclohexane, 2-methyl-1,4-butanediamine, 2-aminomethylpyridine or 2-aminomethylpyrrolidine.

6. The pullulan derivative of claim 1, wherein Y is hydroxo, chloro, hydrogencarbonato or acetato.

7. A pharmaceutical composition which comprises a therapeutically effective amount of at least one pullulan derivative or a pharmaceutically acceptable salt thereof as claimed in claim 1 and a pharmaceutically acceptable carrier therefor.

8. A pharmaceutical composition which comprises as an active ingredient an effective amount of a pullulan derivative or a pharmacologically acceptable salt thereof as claimed in claim 1 and further comprising at least one additional agent selected from the group consisting of buffers, local anesthetics, hypnotics, analgesics and mixtures thereof.

* * * * *